United States Patent [19]

Rowe

[11] 4,284,943
[45] Aug. 18, 1981

[54] APPARATUS AND METHOD FOR CONTROLLING THE SPEED OF AN INDUCTION MOTOR IN A CLOSED-LOOP SYSTEM

[75] Inventor: Denton C. Rowe, Coon Rapids, Minn.

[73] Assignee: Electric Machinery Mfg. Company, Minneapolis, Minn.

[21] Appl. No.: 11,855

[22] Filed: Feb. 13, 1979

[51] Int. Cl.³ .......................... H02P 5/28; G06F 7/28; E21B 33/03; F16K 31/12
[52] U.S. Cl. ................................... 318/806; 318/611; 318/645; 318/335; 318/307; 364/734; 166/53; 166/68; 137/487.5; 417/53
[58] Field of Search ............... 318/806, 334, 335, 636, 318/645, 611, 573, 807; 166/53, 68; 417/53; 137/487.5; 364/723, 509, 510, 734, 422, 804

[56] References Cited

U.S. PATENT DOCUMENTS

| | | | |
|---|---|---|---|
| 3,372,268 | 3/1968 | Hoernes | 364/723 |
| 3,613,391 | 10/1971 | Harter | 318/806 |
| 3,699,989 | 10/1972 | O'Connor et al. | 137/487.5 |
| 4,031,369 | 6/1977 | Heaman et al. | 235/151.11 |
| 4,061,565 | 1/1977 | Kawai | 235/152 |
| 4,102,394 | 7/1978 | Botts | 166/53 |
| 4,199,817 | 4/1980 | Conkling et al. | 364/734 |
| 4,200,827 | 4/1980 | Oswald | 318/561 |

Primary Examiner—J. V. Truhe
Assistant Examiner—John B. Conklin
Attorney, Agent, or Firm—Merchant, Gould, Smith, Edell, Welter & Schmidt

[57] ABSTRACT

A method and control apparatus are disclosed for maintaining a measured parameter of an environment in a closed-loop system within a range of the desired level for that parameter, to an accuracy greater than that of the parameter measuring device in the closed-loop system. The control apparatus periodically receives measurement readings of the parameter to be controlled from a sensor, having a fixed measurement accuracy. An adjustable length memory stores a historical value of changes between the periodically obtained parameter measurements that have occurred over a predetermined length of time. The control apparatus and method generates a control signal for regulating a prime mover acting on the environment which affects the measured parameter, by combining the historical value change data stored in the memory with the difference between a current parameter measurement and the desired parameter value. Means for conditioning the historical data in response to weighting factors corresponding to the closed-loop environment are provided.

11 Claims, 26 Drawing Figures

FIG. 16a
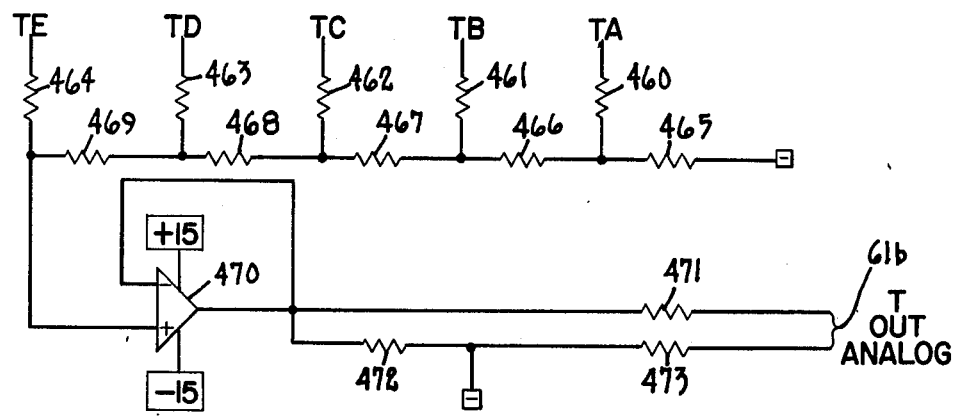
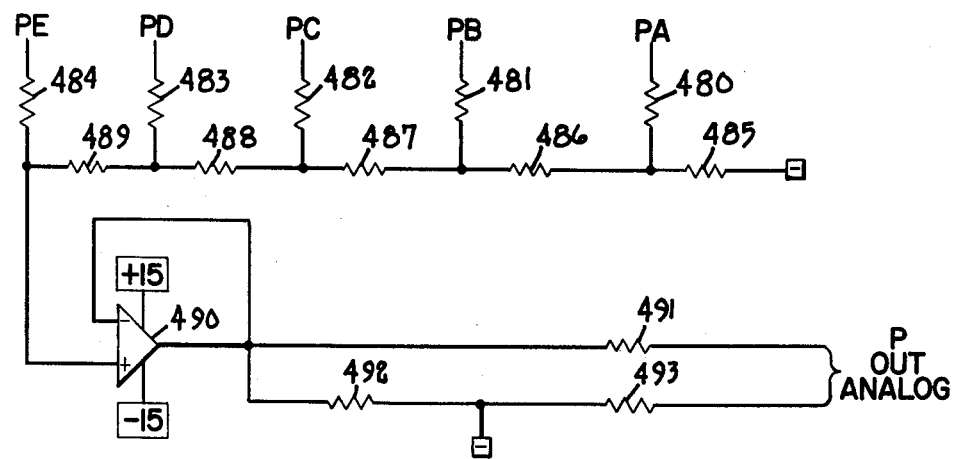
ANALOG OUTPUT CIRCUITS
FIG. 16b

FIG. 22
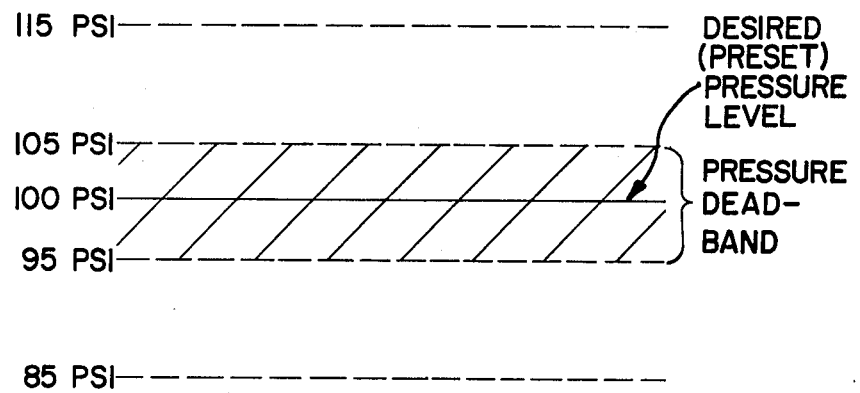
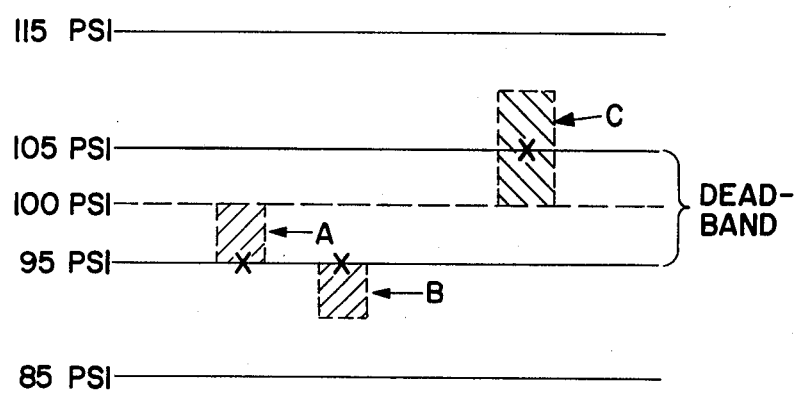
X = SENSOR READING
FIG. 23

X = MEASUREMENT READING

FIG. 25

TRUTH TABLE — STEP 5

| A | | | B | C | |
|---|---|---|---|---|---|
| CAUSE | | | MEANING | EFFECT | |
| IGNORE LATCH | P REG BIT 2 OR 3 = "1" | E REG BIT 2 OR 3 = "1" | | ENTER A REG | ENTER D REG |
| SET | X | X | ERROR $\Delta P \geq 20$ PSI | O | O |
| CLEAR | O | O | $\Delta P = 0$ PSI | I | I |
| CLEAR | I | O | $\Delta P > 0$ PSI | I | O |
| CLEAR | O | I | $\Delta P < 0$ PSI | O | I |

X = IGNORE
O = NOT TRUE
I = TRUE

TRUTH TABLE — STEP 10

| A | | B | | C |
|---|---|---|---|---|
| A REG OUTPUT | D REG OUTPUT | P REG. CONTROL SIGNAL | | CHANGE IN P REG |
| | | U/D (UP OR DOWN) | CLOCK | |
| O | O | DON'T CARE | NO PULSE | O |
| I | I | DON'T CARE | NO PULSE | O |
| I | O | UP | PULSE | +1 |
| O | I | DOWN | PULSE | −1 |

FIG. 26

APPARATUS AND METHOD FOR CONTROLLING THE SPEED OF AN INDUCTION MOTOR IN A CLOSED-LOOP SYSTEM

TECHNICAL FIELD

This invention relates broadly to motor speed control apparatus. More particularly, this invention relates to a method and control circuit for regulating the speed of a motor in a closed loop system in response to sensed environmental conditions, and finds particular application in the oil industry for controlling operation of submersible oil well pumps.

BACKGROUND OF PRIOR ART

There are many uses for induction motors where it is required or desirable to variably control the motor's speed in response to a sensed condition that is related to the particular task being performed by the motor. A.C. induction motors have long been favored for use in industrial applications, due to their simplicity, cost-effectiveness and high reliability. The A.C. induction motor is basically a fixed speed motor. However, since its speed of operation depends upon the frequency of its energizing power, the induction motor can be made to operatively function as a variable speed motor by varying the frequency of its energizing source.

A number of various techniques for providing a variable frequency drive to an A.C. induction motor are known. Solid state technology has provided a number of such devices, commonly referred to as solid state adjustable frequency inverters. An example of such a solid state inverter, sold under the Ampli-Cycle ® tradename and mark and owned by the common assignee of this invention, is disclosed in U.S. Pat. No. 3,748,556, issued on July 24, 1973, to Gillett. Such solid state adjustable frequency inverters generally provide output pulses of voltage and current which are electronically formed into simulated sine waves, which are used to directly energize the A.C. induction motor.

Variable speed induction motor networks have been used in a number of industrial applications, in both open and closed-loop systems, wherein the speed of the motor is varied in response to a sensed condition. In an open-loop system, the sensed condition is merely monitored, and perhaps recorded, and the motor speed is manually adjusted in response to the monitored signal. In a closed-loop system, a control network is interposed between the sensor and the motor, for directly controlling the motor speed responsive to the sensed condition.

Use of the variable speed induction motor has been found to be particularly advantageous in driving pumping apparatus for use in industrial pumping applications, wherein it is desirable to control or to regulate the speed of pumping in response to variable sensed conditions, either from the source of liquid being pumped or from the reservoir into which the liquid is being pumped. Typically, in such applications, the time constants involved (i.e. the length of time required for the pumping apparatus to effect the desired change in the controlled environment, following a sensed undesired condition) are relatively short. Accordingly, for example, in the pumping of sewage, extreme control accuracy over the speed of the induction motor is not required. Oftentimes in such applications, a simple open-loop system will suffice, wherein the operator of the system can manually adjust the frequency of the induction power source to effect the desired change in pumping speed.

However, control of pumping speed, and thus the accuracy of controlling the input power frequency for an induction motor, is extremely important when the induction motor is used to drive a submersible pump for pumping oil from deep oil wells. In such applications, the induction motor itself is located within the casing near the bottom of the well (oftentimes as much as a mile below the ground surface), and is itself submersed within the oil medium being pumped from the casing.

The "artificial lift" or "pumping" of oil from an oil well is employed in all phases of "secondary" and "tertiary" recovery applications, and is also sometimes used in the "primary" recovery of oil from the well. A number of different methods, besides usage of the induction motor operated pump method, have been used for such "artificial lift" oil pumping applications. Due in large part to its mechanical simplicity and reliability, the well-known "rod pumping" technique has been the most common method employed for artificially pumping oil from an oil well.

The rod pump basically comprises a mechanical pump located near the bottom of the well casing at the level of the oil reservoir, which is activated by a sucker rod that extends from the pump, through the casing, and all the way up to the well head at the ground surface. The top of the sucker rod is secured to a "walking beam" (rocker arm) that moves up and down through the force of a crank and counterweight powered by a prime mover. As the sucker rod moves up and down, the mechanical pump is activated to lift oil from the reservoir and up to the surface. The most critical element of the rod pump is the sucker rod, which mechanically extends thousands of feet in length, and tends to operate like a flexible spring. Accordingly, significant stresses can develop in the rod, causing metal fatigue and breakage thereof, leading to substantial down time for repairs. Further, due to the mechanical linkage requirements of the rod pump, it can be used only in wells having straight casings (i.e. wherein the oil is accessible only through a straight hole).

Other artificial lift techniques for removing oil from a well include the "gas lift" and "hydraulic pumping" techniques. The gas lift technique is useful primarily in association with wells having a readily available supply of natural gas. This technique basically consists of forcing gas into the well casing, and providing a series of gas lift valves along the tubing in a manner such that the gas forces the oil into the tubing and to the well head. This method is practical for use only with a naturally available source of gas. The hydraulic pumping technique employs a pump located at the reservoir level which is driven by hydraulic means, rather than by a mechanical motor. Typically the hydraulic drive is provided by crude oil which has already been removed from the well, which is forced down the tubing, under pressure, to activate the hydraulic motor. This technique makes testing of the well difficult, since both power supplying oil and the new oil to be pumped are present in the well stream.

Use of the induction motor pumping technique is rapidly gaining acceptance and is among the fastest growing artificial lift methods used in oil production today. Because the induction motor pump receives its power through flexible cable, rather than through a sucker rod, this pump is appropriate for installation in deviated wells, or other wells not accessible through a straight hole. Further, the induction motor pump is capable of producing very high volumes of oil from the well.

Prior art techniques for recovering oil by induction motor pumping techniques have suffered from serious problems, due in large measure to the inability of prior art induction motor pumping systems to accurately control and to optimize the pumping speed in response to the changing pressure conditions within the oil well reservoir.

Due to the large distance required to lift the oil from the reservoir to the top of the well, significant back-pressure due to the weight of the column of oil being lifted is applied to the submersed pump. Accordingly, the induction motor operating the pump must be powerful enough to perform the heavy lifting operation. The ability of the pump to perform the required pumping operation, and therefore also the power requirements for energizing the induction motor of the pump, will depend in large measure upon the pressure exerted by the oil reservoir within the casing upon the pump. It is highly desirable to maintain the oil reservoir pressure within the casing as constant as possible, to optimize the efficiency of pumping from the well. For example, if a decrease in pressure within the oil reservoir occurred, and was not responded to soon enough, the speed of the pump may be too fast, causing the level of oil within the reservoir to drop below the level of the pump, causing gasification of the oil being pumped, and possible damage to the pump by overheating due to lack of cooling from the normally surrounding oil reservoir. Such a condition can be extremely costly, should the pump be required to be removed for repair. On the other hand, should an increase in oil reservoir pressure, due to changing oil field conditions, go unnoticed, the pump would not be operating at its maximum pumping efficiency, since with the increased reservoir pressure, the pumping speed could be increased.

Control of the motor speed, however, in such oil recovery applications, has heretofore not been performed with a closed-loop system, due in large measure to the long time constant associated with such pumping techniques. Such long time constants, also make control of such an induction motor pumping system by analog techniques impractical. Accordingly, digital pressure and temperature sensing methods for sensing the temperature and pressure of the oil reservoir within the casing have been used. An example of such a digital pressure and temperature sensor which has been successfully used with such oil well pumping applications is described in U.S. Pat. Nos. 3,968,691 issued on July 13, 1976, and 4,078,232 issued on Mar. 7, 1978, both to Balkanli.

While the digital pressure and temperature sensing techniques described by the Balkanli patents offer a significant improvement in the art of measuring temperature and pressure within an oil well reservoir, the accuracy of control of the submersed induction motor pump has heretofore been limited by the digital accuracy of the sensing device. For example, if the lowest increment of measurement recordable by the digital sensor were 10 p.s.i., control of the induction motor speed so as to maintain the oil reservoir pressure at a desired pressure level, was virtually impossible. In the prior art open-loop system of controlling the induction motor speed in response to a sensed reading from the digital sensor, an operator would have to guess at the appropriate change in speed level required in the system. After effecting the change in motor speed, due to the long time constant involved before recognition of the effect of the changed speed could be realized, the operator would have no way of determining whether his change in speed guess had been correct until the system had had an adequate time in which to stabilize to the changed conditions. Such techniques involved significant operator attention, and resulted in considerable oscillation of pressures within the oil well reservoir, due to "overshooting" and "undershooting" of the optimum pressure level, due to the guessing technique employed at controlling the motor speed.

The present invention solves the hit-and-miss guessing problems of the prior art techniques associated with control of induction motor pump speeds, by providing a control apparatus and method for regulating the speed of an induction motor pump so as to maintain the oil reservoir pressure at a level of accuracy "greater" than the accuracy of pressure measurement provided by the sensor itself. The control apparatus and method of this invention accurately predict, based on past operative conditions of the system over a period of time, the proper changes in motor speed currently required to effect the desired operational condition being sensed. Applicability of the present invention for use in pumping operations for oil and other mediums, and generally, to the closed-loop control of an induction motor speeds in response to a sensed variable parameter, will be readily apparent upon a more detailed description of the present invention.

SUMMARY OF THE INVENTION

The present invention comprises a method and control apparatus for providing control signals to accurately regulate the speed of a prime mover acting within and upon a particular environment, such that a selected measured parameter of that environment is controlled to an accuracy greater than that of the parameter measuring apparatus that provides the measured signal to which the control unit responds. In particular, the invention is applicable to closed-loop control networks which automatically act upon the particular environment to control the selected measured parameter of that environment. The invention is further particularly applicable to such closed-loop control systems wherein the prime mover being controlled is an A.C. induction motor.

As applied to a method of controlling the value of a measured parameter of an environment in a closed-loop control system to an accuracy greater than that of the means measuring said parameter, so as to maintain the value of the measured parameter within the maximum accuracy tolerance levels of the means measuring that parameter, the method of this invention is practiced in a closed-loop system characterized by: sensing means for measuring the environmental parameter and for providing a measurement signal responsive thereto wherein the sensing means has upper and lower measurement accuracy tolerance levels defining a measurement accuracy dead-band about the measurement signal; control means which are connected to receive the measurement signal for producing a control signal in response thereto; and a prime mover connected to receive the control signal and being responsive thereto to act upon the environment in a manner such that the prime mover action affects the value of the measured parameter. In such a closed-loop control system, the method practiced by this invention comprises the steps of:

(a) determining a desired value at which the environmental parameter of concern is to be maintained;

(b) causing the prime mover to act upon the environment so as to place the value of the one parameter within the measurement accuracy dead-band tolerance level of the sensing means;

(c) periodically causing said sensing means to measure said one environmental parameter, to periodically produce parameter measurement signals indicative of the value of the measured parameter;

(d) causing said periodically produced measurement signal to be transferred to the control unit of the closed-loop system;

(e) determining the respective changes in values between successive ones of the periodically produced and transferred measurement signals and producing parameter change signals in response thereto, representative respectively of each said determined change in value;

(f) storing in a memory said respective parameter change signals which represent a predetermined successive number of said measurement signals last transferred in time to said control unit;

(g) determining a cumulative value of the parameter change signal stored within the memory;

(h) generating a control signal in response to the determined cumulative value of the stored parameter change signals, which will be used for changing the operable speed of the prime mover of the closed-loop system; and (i) causing the prime mover to be energized in response to the generated control signal, whereby the prime mover acts upon the environment in a manner so as to maintain the value of the measured parameter at a value within the measurement accuracy dead-band tolerances of the sensing means, thus attaining a control accuracy for the environmental parameter which is more accurate than the accuracy tolerance levels of the sensing means itself.

As applicable to a closed-loop system wherein the prime mover comprises an A.C. induction motor which is energized by an adjustable-frequency power converter which provides a variable frequency power signal which changes the speed of the induction motor in proportion to the change in frequency, in such a system the induction motor is connected to appropriate means for performing a function having an effect upon at least one external measurable parameter of an environment. A sesnor means is disposed to sense the measurable parameter being affected by the induction motor prime mover apparatus, and periodically provides a measurement signal responsive to the value of the measurable parameter. The measurement signal thus produced is accurate within a measurement error band based on the measurement accuracy of the sensing means. In combination with such an induction motor closed-loop system, the invention comprises: control means suitable for operative connection to receive the periodic measurement signals from the sensor means and to provide a control signal to the adjustable-frequency power converter means. The control means generates the control signal responsive to cumulative changes in the measurement signals received over a predetermined period of time, and the nature of the control signal thus produced is such that when applied to the power converter, the power converter energizes the induction motor so as to regulate the measurable parameter acted on by the means connected to the induction motor, to an accuracy greater than the measurement accuracy of the sensor means.

The invention as applied to the control of a closed-loop system as above described is particularly useful in the control of oil-pumping operations from deep oil wells, wherein the A.C. induction motor operates a pump, both of which are submersed at the bottom of an oil well within the oil being pumped. In such case, the external measurable parameter comprises the oil pressure at the bottom of the well, and the sensor means includes a sensor mounted adjacent the submersed motor and pump at the bottom of the well. The control means in such application of the invention regulates the speed of the induction motor, and thus the rate of pumping oil from the well, so as to maintain an actual pressure value at the situs of the pump in the well, which is more accurate than the most accurate possible reading by the sensor means which measures the pressure in the well, and produces the measurement signal upon which the control unit acts in regulating the induction motor speed.

A more detailed description of the control apparatus constructed according to the principals of the invention, and suitable for providing a master control signal to a device within a closed-loop system which acts upon an environmental medium having at least one measurable parameter desired to be controlled would comprise:

(a) means for setting a desired value for an environmental parameter being controlled by the closed-loop control system;

(b) means for periodically obtaining a measurement signal of the measured environmental parameter to be controlled, the measurement signal so obtained having upper and lower accuracy tolerance levels;

(c) means connected to receive said obtained measurement signals for determining the change in value of successively received ones of said obtained measurement signals and for producing first change signals representative respectively thereof;

(d) memory means operatively connected to receive said first change signals for storing and retaining in ordered manner said first change signals representing a predetermined successive number of said measurement signals last received in time;

(e) means operatively connected with said memory means for generating a first control signal representative of the cumulative value of said stored first change signals;

(f) means for determining the difference in value between the last obtained said measurement signal and said desired set value, and for providing a second control signal representative thereof;

(g) means operatively connected to receive said first and said second control signals, for generating a master control signal cumulatively representing the values of said first and said second control signals; and (h) means operatively connected to receive said master control signal and being responsive thereto to act upon said environmental medium to maintain the value of said measured parameter within a tolerance range of said set desired value which is tighter than the tolerance range of said measurement signal as represented by said upper and said lower tolerance levels.

The invention also contemplates means for varying the length of the memory into which the changes in value of the measured signals are stored, and from which the cumulative value of the measurement change signals is derived. The invention also contemplates use of an adjustable weighting means connected with the memory for multiplying the cumulative value of the measurement change signals stored in the memory by a weighting constant, which constant can be adjusted to suit the particular application of the closed-loop system.

As applied to its application in an oil-well pumping closed-loop control system, the theory of operation of the invention is relatively simple. A desired pressure level to be maintained in the oil well is set into the control apparatus. The control apparatus periodically causes a sensor located in the well to provide a measurement reading of the pressure within the well. The accuracy of that measured pressure reading is only as great as the accuracy of the sensing device, and varies within a pressure accuracy tolerance dead-band. The control apparatus receives the periodic measurement signals, compares the received measurement signal against the desired pre-set value and determines a first control value. Also, as the measurement signals are periodically received from the sensor, the control apparatus determines the change in value between the currently received measurement signal and the last in time received measurement signal, and the direction (i.e. polarity) of that change. These respective "changes" are stored within a memory, which accumulates a historical log of a predetermined successive number of such changes which last occurred over a period of time. In response to the cumulative value of the change value stored in memory, the control unit develops a second change signal. The second change value can be weighted according to a predetermined constant value which reflects the geological conditions of the oil field.

The first and second change values or signals are added, and weighted by a factor suitable for energizing the device being controlled (in the case of an induction motor in an oil field application, a potentiameter motor of the power converter unit energizing the induction motor). The result in control signal is used to regulate the power converter which controls the speed of operation of the induction motor moving the oil pump. The output control signal thus produced enables regulation of the pump so as to control the actual pressure within the oil well to maintain that pressure at a level which is narrower than the pressure accuracy tolerance deadband capabilities of the sensor.

In practicality, when the actual well pressure is far outside of the tolerance dead-band range around the pre-set desired pressure, the first change signal will pre-dominate in providing motor speed change information reflected in the control signal produced. As the actual well pressure enters the dead-band around the desired pre-set pressure level, the second change value produced by the control unit will pre-dominant in regulating the change in motor speed as reflected in the output control signal of the control unit. Therefore, the motor will be controlled so as to cause the actual pressure level within the well to rapidly approach the desired pressure level, and once the actual pressure is within the sensor tolerance dead-band zone surrounding the pre-set desired pressure level, the control apparatus of this invention will maintain the actual pressure within that dead-band.

It will be understood that many configurations of control units incorporating the principals of this invention can be designed within the spirit and scope of this invention. While the preferred embodiment of the present invention will be described in association with a particular configuration of a control circuit in a closed-loop system, and in usage of a control-loop system in the particular application of oil pumping control, it will be understood that the invention is not limited to either such control configuration or the particular closed-loop system application disclosed.

Various advantages and features of novelty which characterize the invention are pointed out with particularity in the claims, annexed hereto and forming a part hereof. However, for a better understanding of the invention and its advantages obtained by its use, reference should be had as to the Drawing which forms a further part hereof and to the accompanying descriptive matter in which there is illustrated and described a preferred embodiment of the invention.

BRIEF DESCRIPTION OF THE DRAWING

Referring to the Drawing, wherein like numerals represent like parts throughout the several views:

FIG. 16 is a schematic diagram of the Drive Circuits for the Temperature and Pressure external recording units disclosed in FIGS. 1 and 2, and forming a portion of the network disclosed in FIG. 4;

FIG. 22 is a diagram indicating the "dead-band" of pressure values measurable by a sensor, due to the digital nature of the sensor and the accuracy tolerance limits thereof;

FIG. 23 is a pictorial diagram indicating various pressure measurement conditions discussed in the specification with respect to a description of the preferred embodiment application of the invention;

FIG. 25 is a truth table indicating various conditions and responses associated with the execution of Step 5 of the Data Processing Cycle of the Control Circuitry forming the preferred embodiment of the invention; and FIG. 26 is a truth table illustrating various conditions and responses associated with execution of Step 10 of the Date Processing Cycle performed by the Control Circuits in a preferred embodiment of the invention.

DETAILED DESCRIPTION OF THE INVENTION

Figure 1:
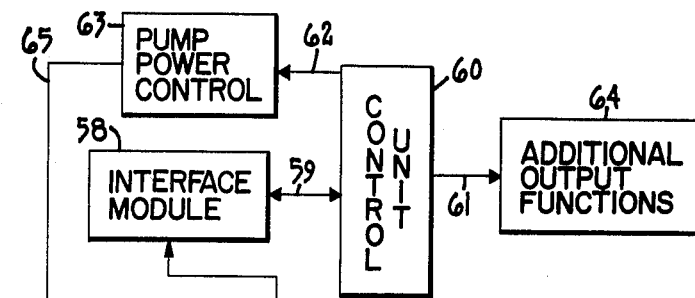
FIG. 1 is a diagrammatic view of the invention as applied to a preferred embodiment application in a closed-loop oil pumping system.

Referring to FIG. 1, a diagrammatic view of the present invention as applicable to control of an induction motor pump for pumping oil from a well in a closed-loop pumping control system as disclosed. Oil wells typically have a casing 50 downwardly extending through a layer of earth 51 and extending into an underlying oil reservoir 52 from which the oil is to be pumped. In such oil pumping applications, it is not uncommon for the length of the oil casing to exceed five thousand feet. The lower portion of the casing 50 is perforated as indicated at 50a to permit flow of oil from the reservoir 52 into the central portion of the casing 50, such that the oil level within the casing 50 generally coincides with that of the oil level of the primary reservoir 52. The ground level of the layer of earth through which the well is drilled is generally indicated at 51a.

Figure 2:
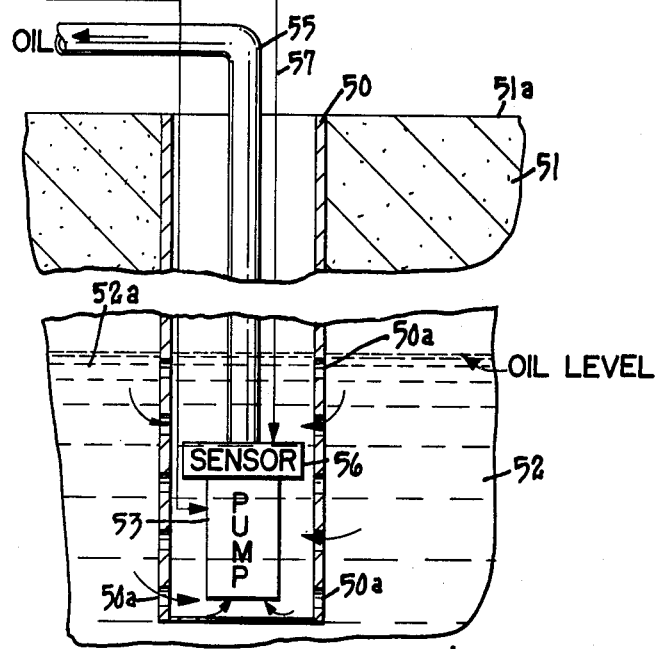
FIG. 2 is a block diagram representation of the invention as employed within a closed-loop system as disclosed in FIG. 1.
Figure 2:
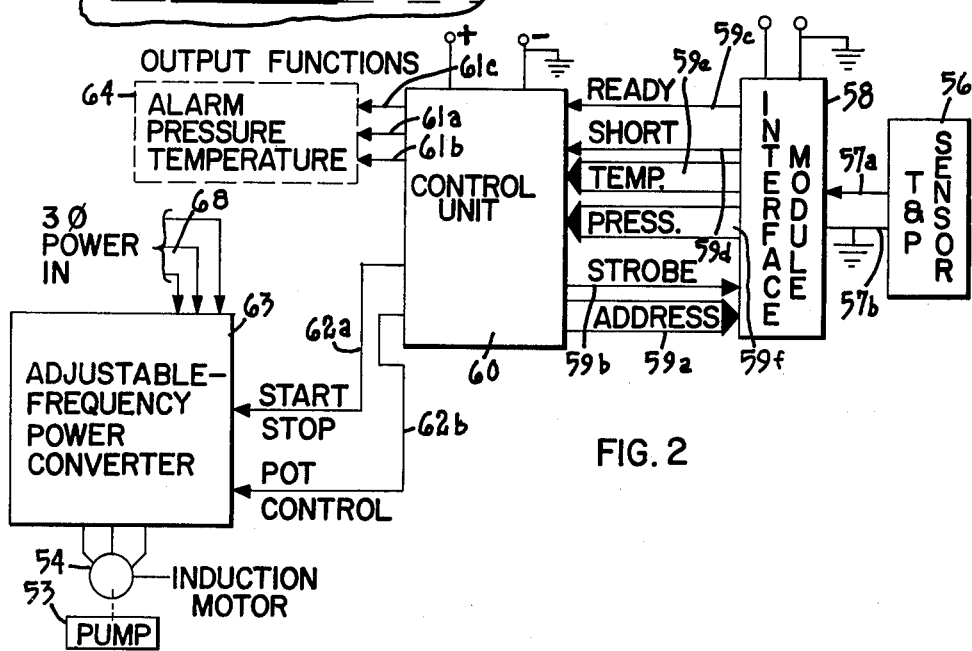

Oil is extracted from the well by means of a centrifugal pump 53 powered by an A.C. induction motor 54 (FIG. 2). The induction motor and pump combination (53, 54) are submersed within the oil, and are disposed at a position within the casing 50, such that the pressure level exerted thereon by the column of oil located above them in the casing is approximately 100 p.si. The pump 53 is operatively connected to a conduit 55 through which it transmits pumped oil to the surface of the well. Due to the depth of the "deep" oil wells, the pump 53 and induction motor 54 combination must be sufficiently powerful so as to adequately lift the weight of the column of oil carried thereabove and within the conduit 55, to the surface of the well. In the referred embodiment illustrated, the induction motor is a 3600 rpm motor which is variably operble (as hereinafter described) over a range of 1400 to 3800 rpm.

A temperature and pressure sensor 56 is mounted between the sensor 56 and the interface module 58. As herein employed in describing the interconnection between various circuits of the preferred embodiment, and in particular with respect to the individual conductors comprising a signal flow path, those conductors included within a particular signal flow path which has been previously numerically designated, will contain that same numerical designation followed by one or more letters of the alphabet. Upon activation by the interface module, the sensor 56 slowly transmits temperature and pressure digital information (over approximately ten second time interval) to the interface module. In the preferred embodiment (and as described in U.S. Pat. No. 3,968,691) the sequence of the bits in the signal transmitted by the sensor 56 is indicative of the measured pressure, and the frequency of the signal is indicative of the measured temprature.

The interface module 58 is, and the preferred embodiment, an off-the-shelf unit designated as a Computer Interface Module manufactured by Lynes, Inc. of Texas, specifically for receiving the temperature and pressure data received from the sensor 56, and for rearranging that data for parallel transfer to a processing unit (such as the control unit 60). In the preferred embodiment, the interface module 58 includes capability for servicing up to fifteen different sensors 56. Accordingly, a 4-bit address signal input, generated by the control unit 60 and presented to the interface module 58 by means of the Address signal flow path 59a is required in the embodiment disclosed to cause the interface module 58 to select the sensor 56 during a data recovery cycle thereby. Upon receipt of the 4-bit address signal from the control unit 60, the interface module 58 energizes the sensor 56 and monitors the binary coded current signal transmitted to the interface module 58 by means of the conductor 57a. A processors circuit within the interface to the tubing or to the pump 53 within the casing 50 and provides temperature and pressure measurements of the oil 52a within the casing 50 at the situs of the pump 53.

The sensor 56 is energized by and provides temperature and pressure output signals by means of a signal flow path 57 to an interface module 58. The interface module 58 is connected by means of a signal flow path 59 to a control unit 60, to which this invention pertains. The control unit 60 provides an output control signal to a pump power control module 63 by means of a signal flow path 62. The control unit 60 also provides output signals by means of a signal flow path 61 to additional output functions such as recorders, alarms and the like, generally designated at 64. The pump power control module 63 provides a variable frequency three-phase power signal, in response to control signals received from the control unit 60, for energizing the induction motor 54, by means of a signal flow path 65.

A somewhat more detailed block diagram of the various circuits comprising the closed-loop control system disclosed in FIG. 1, is illustrated in FIG. 2. Referring thereto, the sensor 56 comprises a temperature and pressure sensor for periodically measuring the temperature and pressure of the oil 52a within the casing 50 at the situs of the pump 53. In the preferred embodiment, the sensor 56 comprises a network such as described within U.S. Pat. Nos. 3,968,691 issued July 13, 1976, and 4,078,232 issued Mar. 7, 1978, the disclosures of which are herein incorporated by reference. The sensor 56 provides a binary coded output signal indicative of the sensed pressure and temperature readings of the oil, which is transmitted in serial manner by means of the conductor 57a to the interface module 58. The signal flow path 57 is completed by a ground return path 57b. The module conditions the signal contained within the current signal from the sensor and generates the 9-bits of data stored therein as well as the corresponding asychronous clock pulses. As the data is extracted from the sensor signal, it is stored in a shift register, and the number of data bits are counted by a counter. As the ninth data bit is entered into the shift register, a Pressure Ready signal is generated and the 9-bits of information are transferred to a Pressure Register.

The clock pulses generated from the signal received from the sensor 56 and the Pressure Ready signal are decoded to produce temperature information contained therein and a Temperature Ready signal. The temperature information, generated in 9-bit straight binary parallel form, and the Temperature Ready signal are transferred to a Temprature Register.

In the preferred embodiment, the Interface Module 58 is continually energized. After a 4-bit address is received by the signal flow path 59a, designating that pressure sensor 56 which is to be energized, as soon as a high to low voltage transition occurs at the strobe input of the module 58, the addressed sensor 56 will be energized. The strobe signal is generated within the control unit 60, as hereinafter described, and is transmitted to the Interface Module 58 by means of the signal flow path 59b. Upon generation of both the Pressure and Temperaure Ready signals, a composite P & T Ready Signal is generated by the Interface Module 58 and is applied by means of the signal flow path 59c to the Control Unit 60. A logical "high" P & T Ready Signal indicates that the Pressure and Temperature information is ready for transmittal from the Interface Module 58 to the Control Unit 60. The information at the Temperature and Pressure outputs of the Interface Module 58 will be updated each time the sensor 56 completes a data cycle. The Interface Module 58 also generates a "short-circuit" signal whenever, and if a short-circuit occurs on the signal line 57a leading from the sensor 56. This "short-circuit" condition is immediately transferred by means of the signal flow path 59d to the Control Unit 60.

The Interface Module 58 and the Control Unit 60 are interconnected for energization from a common power supply (not indicated). Throughout the figures of the Drawing, the energizing power required for the various circuits will be indicated by a (+) or a (−) designation. If no such designation appears, it will be understood that the appropriate power supply connection are present to effect an operable circuit. Unless otherwise designated, the (−) power supply connection will also be referred to by the "common" or "ground" reference designation.

The temperature data is transferred from the Temperature Register of the Interface Module 58 by means of the signal flow path 59e comprising nine conductors representing the 9-bit temperature word. The pressure data is transferred from the Pressure Register in the Interface Module 58 by means of the signal flow path 59f, to the Control Unit 60. The signal flow path 59f comprises nine conductors for transmitting parallel the 9-bits of data comprising the pressure word. In the preferred embodiment, the plurality of conductors comprising the signal flow path 59 are contained within a single 37-conductor cable.

The Control Unit 60 provides a "start/stop" signal to the Pump Control Module 63 by means of the signal flow path 62a (FIG. 2), and also provides a "potentiometer control" signal for varying the frequency of the power provided by the Pump Control Unit 63 to the induction motor 54, by means of the signal flow path 52b.

In addition to the above control output signals, the Control Unit 60 also provides two analog output signals to operate recorders so as to provide a record of actual temperature and pressure measurements received from the Interface Module 58. The analog pressure output signal is provided by means of the signal flow path 61a, and the analog temperature output signal is provided by means of the signal flow path 61b. The Control Unit 60 also provides a C-form contact output which provides an alarm signal for energizing a customer alarm, whenever, the Control Unit 60 turns the Pump Control Module 63 off by means of a "stop" signal transmitted by the signal flow path 62a. The "alarm" signal is provided by means of the signal flow path 61c.

The Pump Power Control Unit 63 comprises in the preferred embodiment an adjustable-frequency power converter sold and manufactured by the common assignee of this invention under the tradename and mark Ampli-Cycle ®. Details of construction of the Ampli-Cycle ® unit are described within U.S. Pat. No. 3,748,556, issued on July 24, 1973 to Gillett, and incorporated herein by reference. While the details of construction of the Power Converter 63 will not be set forth herein, this unit is basically offerable to transmit a 3-phase A.C. power signal (generally designated at 68) to the induction motor 54, and to varied frequency of the 3-phase power in response to a control signal received from the Control Unit 60 by means of the signal flow path 62b. In the preferred embodiment, the 3-phase input power signal is a 460 voltage signal.

Figure 3:
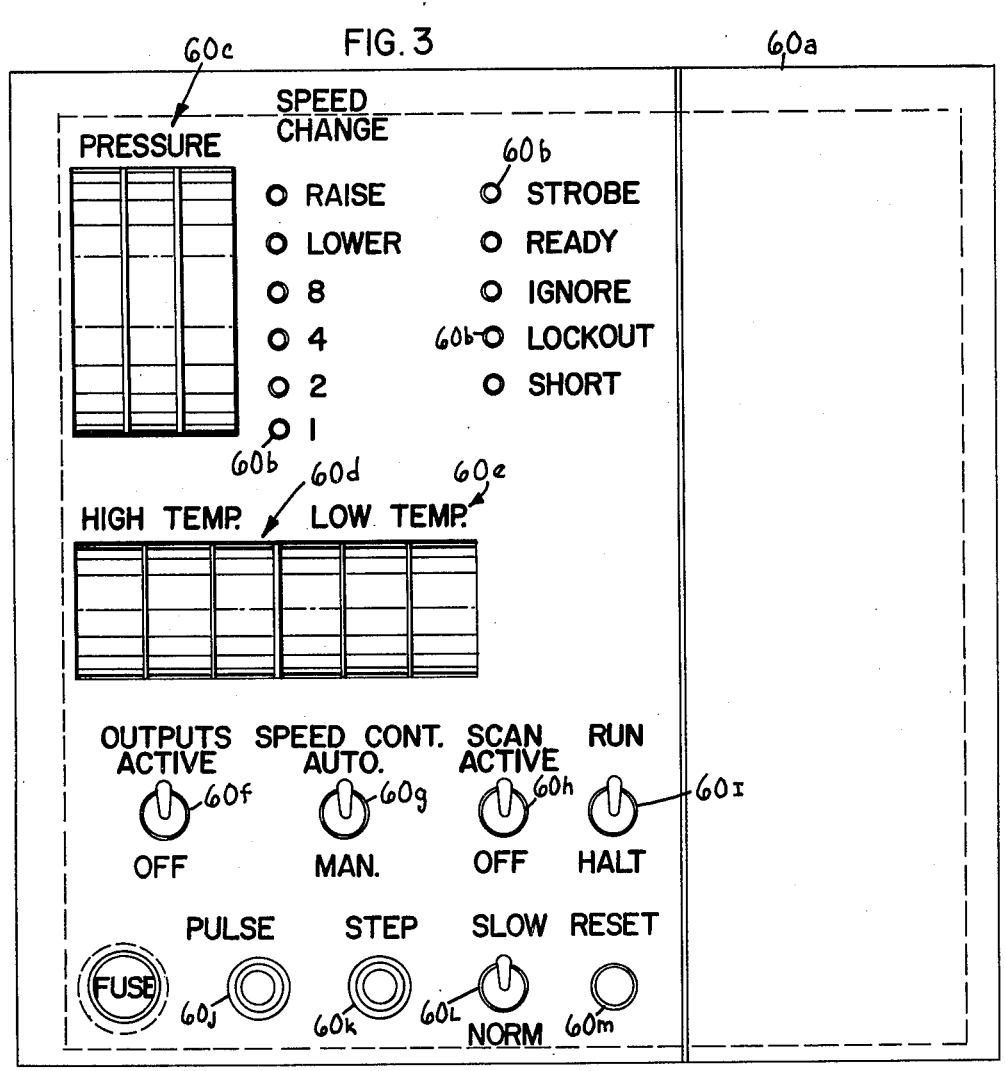
FIG. 3 is a diagrammatic view of a control of the chassis of the Control Unit portion of the circuit disclosed in FIGS. 1 and 2.

In the preferred embodiment, the Control Unit 60 is housed within a chassis, generally designated at 60a in FIG. 3. The chassis includes a number of light indicators (generally designated at 60b) which become illuminated during various portions of the control cycle, to indicate various functions or conditions being executed by the Control Unit 60. In FIG. 3, those functions designated are: "raise", "lower", "8", "4", "2", "1", "strobe", "ready", "ignore", "lockout" and "short". The control panel also includes three thumb-wheel switch selectors, designated at 60c, 60d and 60e respectively. In the preferred emodiment, each of the thumb-wheel selector switches (60c, 60d and 60e), comprises three individually setable rotatable thumb-wheel switches, with which the operator may enter a three digit decimal number. The thumb-wheel switch designated at 60c is used to receive a "pressure" entry signal, corresponding to a desired pressure in pounds per square inch (p.s.i.) that used to be maintained at the situs of the pump 53. In the preferred embodiment, the setting on this switch must be multiplied by a factor of 10 to indicate the actual pressure in p.s.i. The "high temp" thumb-wheel switch 60d is operable to receive a setting corresponding to the maximum temperature permitted within the oil well, before the Control Unit 60 will instruct the Power Control Module 63 to shut off the induction motor 54. The "Low Temp" thumb-wheel switch 60e is operable to receive a 3-digit temperature setting corresponding to the temperature to which the oil in the well must decrease once the pump 53 has been shut-off, before the Control Unit 60 will allow the Power Control Unit 63 to re-energize the induction motor 54.

A short description of the illumination status of the various indicator lights 60b may be helpful in later understanding the operation of the Control Unit 60.

The "Strobe" light flashes each time the Control Unit 60 generates a strobe signal, thus starting a data collection cycle.

The "Ready" light is illuminated any time the Interface Module 58 is generating a "ready" signal on the signal flow path 59c. In the preferred embodiment, this normally occurs approximately ten seconds after the strobe signal and continues until the next strobe signal.

The "Ignore" light is illuminated whenever the Control Unit 60 ignores the pressure data received from the Interface Module 58, as a result of Data Processing Step 4 (hereinafter described).

The "Lockout" light will be illuminated if the Control Unit 60 de-energizes the Pump Power Control Unit 63 due to an excessive temperature condition.

The "Short" light is illuminated if the Inteface Module indicates a shorted condition by means of the signal flow path 59d.

The "Raise" light will be illuminated if the Control Unit 60 causes an increase in frequency of the energizing power sent to the induction motor 54, during the last data collection cycle.

The "Lower" light will be illuminated if the Control Unit 60 has caused a reduction in the energizing power frequency supplied to the induction motor 54, during the last data collection cycle.

The four numerically designated lights are the "magnitude" lights which indicate the magnitude of the change in frequency to the induction motor 54, which was instructed to occur during the last data collection cycle. The four lights collectively comprise a 4-bit binary number of which 1, 2, 4 and 8 respectively.

The remaining switches and lights on the control panel 60a of the Control Unit 60 comprise testing functions, for enabling trouble-shooting of the Control Unit circuitry. Briefly, the "Outputs Active" switch 60f, if positioned "down", causes all outputs of the Control Unit 60 to be disabled, except the "address" and "strobe" signal outputs. The "Speed Control" switch 60g, if positioned "down", causes only the "pot control" signal to be disabled. The "Scan" switch 60h, if positioned down, will cause disablement of the "address" and "strobe" output signals of the Control Unit 60. The "Run" switch 60i, if positioned "down", will cause processing during a data processing cycle to stop at the beginning of that step determined by the manual setting of switches within the Control Unit 60. The "Pulse" pushbutton switch 60j is used for testing purposes to advance the Control Unit 60 circuitry one clock cycle.

The "Step" pushbutton switch 60k is used for testing purposes to advance the circuitry within the Control Unit 60 by one "Step" within a data processing cycle. The "Slow" switch 60l, if positioned "up" at a time when the "Run" switch is "down", will cause the Control Unit circuitry to process data at a slower rate, for testing purposes. The "Reset" push-button switch 60m is used for testing purposes and resets various flip flops, registers and counters within the circuitry of the Control Unit to an initial state.

Figure 4:
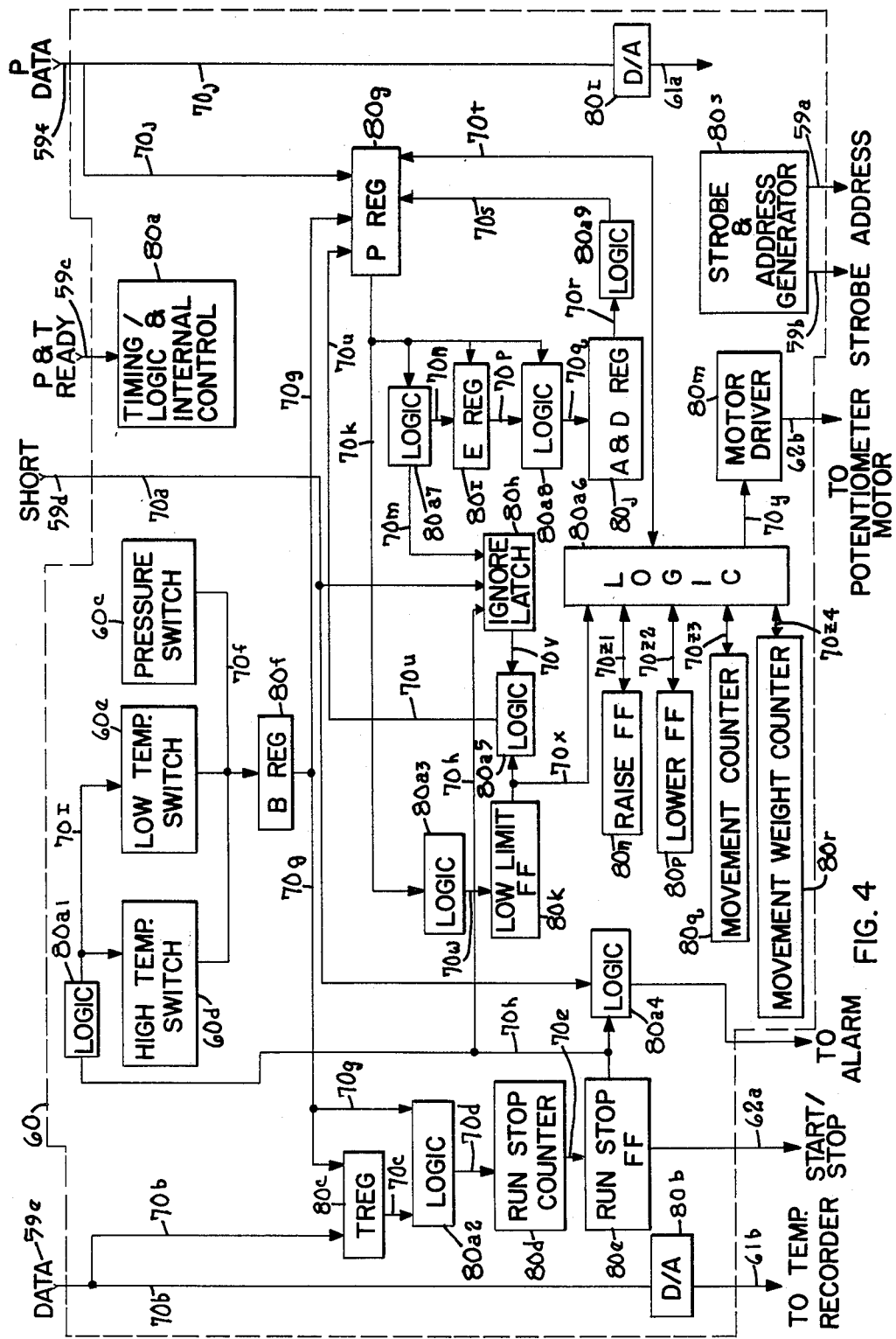
FIG. 4 is a block diagram representation of the networks comprising the Control Unit of the invention disclosed in FIGS. 1 and 2.

A block diagram representation of the Control Unit 60 is illustrated in FIG. 4. Referring thereto, it will be noted that the block diagram illustrated denotes the major functional relationship between the various portions of the circuit switch collectively comprise the Control Unit 60. For ease of description, each signal flow path between the various functional blocks illustrated in FIG. 4 has not been indicated; however, a complete schematic diagram of the preferred embodiment circuits comprising the functional block diagram network of FIG. 4 is provided in the remaining Figures of the Drawing.

Referring to FIG. 4, the Timing/Logic and Internal Control function is illustrated at 80a. This block is intended to represent the various portions of the circuit network which provide the timing and control signals for the remaining circuits of the Control Unit 60. Necessarily, therefore, the Timing/Logic block 80a communicates directly with each of the remaining circuit blocks illustrated in FIG. 4, even though not specifically indicated as such in FIG. 4. Further, all of the functional blocks designated by the term "Logic", likewise form a portion of the primary Timing/Logic functional block 80a. Additional such "Logic" blocks have been indicated in FIG. 4, to assist in the understanding of the operation of the composite circuit. As will become apparent later from a more detailed description of the schematic circuits comprising the Control Unit 60, the so-noted "Logic" functions comprise a plurality of logical gates and associated functions which are scattered throughout the schematic diagrams and which are not readily collectible into concise functional blocks for the purpose of description of the invention. In FIG. 4, the "associated" Logic functional blocks have been denoted by the consecutive numbers 80a1 through 80a9.

The primary Timing/Logic functional block 80a as illustrated as directly receiving the Ready signal from the Interface Module 58, by means of the signal flow path 59c. The Short signal received by the Control Unit by means of the signal flow path 59d, is internally applied within the Control Unit 60 by means of a signal flow path 70a to the Logic functional block 80a4.

The 9-bit Temperature signal received by the Control Unit 60 by means of the signal flow path 59e is internally applied by means of a signal flow path 70b to a digital to Analog drive network 80b. The D/A network 80b processes the received Temperature data signal and transmits an analog representation thereof to an external recorder by means of the signal flow path 81b (see FIG. 2).

The Temperature data signal is also applied by means of the signal flow path 70b to a T (Temperature) Register 80c. The T Register 80c operatively communicates with the Logic functional block 70a2 by means of a signal flow path 70c.

The Logic block 80a2 provides instructions for operating a Run Stop Counter 80d by means of a signal flow path 70d. The Run Stop Counter 80d is operatively conneced with a Run Stop Flip Flop 80e by means of a signal flow path 70e. The Run Stop Flip Flop 80e provides the Start/Stop output signal to the Power Converter 83 by means of the signal flow path 82a (see FIG. 2).

The High Temperature thumb-wheel switch 60d (FIG. 3), the Low Temperature thumb-wheel switch 60e and the Pressure thumb-wheel switch 60c are also disclosed in functional block-diagram form in FIG. 4. Each of the thumb-wheel switches 60c-60e provide signal flow communication by means of a signal flow path 70f to a B Register 80f. The B Register 80f provides signal flow output by means of a signal flow path 70g to the T Register 80c, to the Logic block 80a2, and to a P Register 80g.

The Run Stop Flip Flop 80e provides signal flow output by means of a signal flow path 70h to the Logic functional block 80a1 and to the Logic functional block 80a4. The Logic block 80a1 processes the signal received from the signal flow path 70h and transmits the process signal by means of a signal flow path 70i to the High Temperature Switch 60d and the Low Temperature Switch 60e. The Logic functional block 80a4 also processes the signal received by means of a signal flow path 70h as well as the Short signal and communicates the processed signal information by means of the signal flow path 61c to an external Alarm device (see FIG. 2).

The Run Stop Flip Flop 80e also provides signal communication by means of the signal flow path 70h to an Ignore Latch 80h. The Ignore Latch 80h also receives the Short signal by means of the signal flow path 70a.

The 9-bit Pressure data signal received by the Control Unit 60 by means of the signal flow path 59f is internally transmitted by means of signal flow path 70j to a Digital to Analog functional drive network 80i, which processes the received data and transmits same as an analog signal by means of the signal flow path 61a to an external pressure recording device (not illustrated). The 9-bit pressure data signal is also applied by means of the signal flow path 70j to the P Register 80g.

The P Register, under control of the Timing/Logic circuits 80a provide signal flow output by means of a signal flow path 70k to the Logic functional blocks 80a3, 80a7 and 80a8. The P Register 80g also provides signal flow by means of the signal flow path 70k to an E Register 80i.

The Logic functional block 80a7 processes the information received from the P Register 80g and transmits the processed information by means of a signal flow path 70m to the Ignore Latch 80h, and also by means of a signal flow path 70n to the E Register 80i. The E Register processes information received from the Logic functional block 80a7 and the P Register 80g and communicates in response thereto by means of a signal flow path 70p with the Logic functional block 80a8.

The logic functional block 80a8 processes information received from the E Register 80i and from the P Register 80g and transmits the processed information by means of a signal flow path 70q to an A & D Register 80j. The A & D Register 80j communicates with the Logic functional block 80a9 by means of a signal flow path 70r. The Logic block 80a9 processes the signal received from the A & D Register and transmits the processed signal by means of a signal flow path 70s to the P Register 80g. The P Register 80g also communicates with the Logic functional block 80a6 by means of a signal flow path 70t, and receives signal information from the Logic functional block 80a5 by means of a signal flow path 70u.

The output signals from the Ignore Latch 80h are applied by means of a signal flow path 70v to the Logic functional block 80a5.

The Logic functional block 80a5 processes signals from the P Register 80g and communicates information in response thereto by means of a signal flow path 70w to a Low Limit Flip FLop 80k. The Low Limit Flip Flop 80k provides signal instructions to the Logic functional block 80a5 and to the Logic functional block 80a6 by means of a signal flow path 70x.

The Logic functional block 80a6 provides instructions by means of a signal flow path 70y to a Motor Driver functional block 80m. The Motor Functional block 80m is operable to provide an output control signal (entitled the Pot Control signal in FIG. 2), by means of the signal flow path 62b which energizes a motor of a motor-conrolled potentiameter within the Adjustable Frequency Power converter 63, which effects a change in the frequency of power provided to the Induction Motor 54 - all as determined by the Control Unit 60 circuitry of FIG. 4.

The Logic functional block 80a6 also communicates with and provides logical processing and timing control functions for a Raise Flip Flop 80n by means of a signal flow path 70z1, with a Lower Flip Flop 80 by means of a signal flow path 70z2, with a Movement Counter 80q by means of a signal flow path 70z3 and with a Movement Weighting Timer network 80r by means of a signal flow path 70z4.

A Strobe and Address Generator functional block 80s generates the Strobe signal for initiating a data scan cycle by the Interface Module 58, and transmits the Strobe signal to the Interface Module 58 by means of the signal flow path 59b. The Strobe and Address Generator 80s also generates a 4-bit Address signal which is communicated to the Interface Module 58 by means of the signal flow path 59a at the initiation of a data collection cycle.

Power supply functions are not indicated in the functional block diagram of FIG. 4. In the schematic diagram descriptions to follow, power supply connections are generally indicated; however, it will be understood that when such supply connections are not specifically indicated, they will be understood to be present, to effect a proper operation of the circuits comprising the depicted circuits and networks.

Referring to FIG. 5 through 19, these figures collectively comprise the circuits forming the functional block diagram representation of the Control Unit 60 of FIG. 4. Where possible, the numbering terminology adopted for the various functional blocks in FIG. 4 will be retained when referring to components in the individual schematic diagrams which comprise the various functional blocks. However, since the Timing/Logic and Internal Control network comprises numerous logical and timing elements throughout the various schematic diagrams, circuits forming a part of such Timing-/Logic functional block 80 will be consecutively numered beginning with the numeral 100. Also, to avoid confusion in description and understanding of the various schematic diagrams, the conductors will generally not be labeled, but will be referred to as they relate to the input and output terminals to which they extend.

Figure 12:
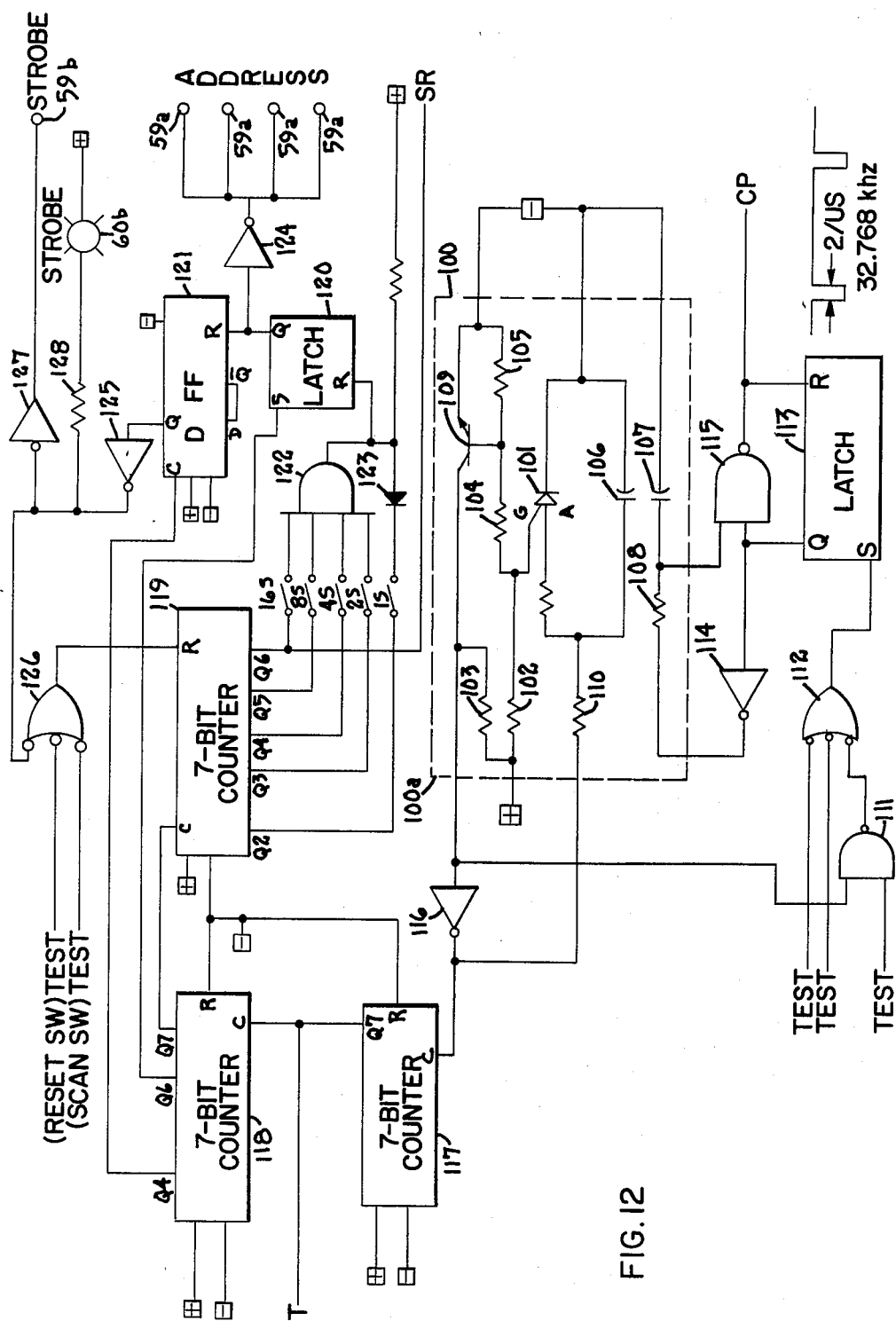
FIG. 12 is a schematic diagram of the oscillator and clock pulse generating portion of the timing and control circuit disclosed in FIG. 4, and of the St;robe and Address Generator portion of the network disclosed in FIG. 4.

Referring to FIG. 12, the Oscillator which provides the basic timing circuit for generating the controlling clock pulses and timing signals used for controlling the various processes executed by the Control Unit 60 as illustrated at 100. The "+" and "−" designations enclosed within square box diagrams within the schematics refer to connections to the various positive and negative power supplies. With respect to the logical elements, unless otherwise specified, the "−" terminal is intended to be the same as a "reference" or "ground" potential. The construction of the Oscillator 100, as clearly indicated in FIG. 12 and comprises the P.U. Transistor 101, the Resistors 102, 103, 104, 105, 108 and 110, the Capacitors 106 and 107, and the npn Transistor 109, interconnected to form the Oscillator as illustrated. The Oscillator produces 32.768 khz signal which appears at the output 100a of the Oscillator 100. The Oscillator signal is applied to a first input of a NAND Gate 111. The second input of the NAND Gate 111 receives a signal from the "test" portion of the Control Unit 60 (indicated by the switches 60f through 60m on FIG. 3), circuits of which are not relevant to an understanding of the invention, and which will not be disclosed herein. The signal from the NAND Gate 111 is applied by means of a NAND Gate 112 to a Set input of a Latch 113. The Latch 113 has a Q output connected by means of an Inverter 114 in series with the Resistor 108 to a first input of a NAND Gate 115. The Q output of the Latch 113 is also directly connected to a second input of the NAND Gate 115. The signal output of the NAND Gate 115 is connected to the Reset output of the Latch 113 and also provides an output signal CP. The two signal inputs designated as Test feeding into the NAND Gate 112 are connected to the "little test" circuitry previously described, but not indicated in the schematic figures.

The CP output signal comprises a Clock Pulse signal having a frequency of 32.768 khz with 2 microsec negative going pulses comprising the "clock pulses", as indicated in FIG. 12. The Clock Pulse (CP) signal is used for coordinating timing and control processes in the remaining circuits of the Control Unit 60.

The Oscillator signal output is also applied by means of an Inverter 116 to a Clock input of a 7-bit Counter 117. The seventh bit (Q7) of the Counter 117 is connected to the Clock input of a second 7-bit Counter 118. The signal flow path between the Q7 output of the Counter 117 and the Clock input of the Counter 118 also is designated as the T signal.

The Reset inputs of the Counters 117 and 118 are connected to the reference potential. The Q7 output terminal of the Counter 118 is connected to the Clock input of a third 7-bit Counter 119. The Q6 output of the Counter 118 is connected to a Set input of a Latch 120. The Q4 output of the Counter 118 is connected to a Clock input of a D Flip Flop 121.

The Q2 through Q6 output terminals of the Counter 119 are connected to mechanical switches designated as "1S", "2S", "4S", "8S" and "16S" respectively. The switches designated by the numbers "2, 4, 8 and 16-S", provide input signals to an AND Gate 122. The output of the AND Gate 122 is connected by means of a Diode 123 to the "1S" switch, and is also directly connected to the Reset input of the Latch 120.

The Q output of the Latch 120 is directly connected to the Reset input terminal of the D Flip Flop 121, and is also connected by means of an Inverter 124 to four output terminals comprising the 4-bit Address signal which is sensed to the Interface Module 58 by means of the signal flow path 59a (see FIG. 2).

The D and $\overline{Q}$ terminals of the D Flip Flop 121 are shorted to one another. The Q output terminal of the Flip Flop 121 is connected by means of an Inverter 125 to a first signal input of the NAND Gate 126. The second and third input terminals of the NAND Gate 126 are connected to receive "test" signals from the test circuitry (not illustrated). The signal output of the NAND Gate 126 is applied to the Reset input terminal of the Counter 119.

The output signal from the Q terminal of the Flip Flop 121 is also connected by means of the Inverter 125 and an Inverter 127 to form the STROBE output signal which is transmitted to the Interface Module 58 by means of the signal flow path 59b. The signal from the Q output terminal of the Flip Flop 121 is also connected by means of a Resistor 128 to an indicator lamp comprising the Strobe light 60b on the Control Unit panel (see FIG. 3).

The Q6 output terminal of the Counter 119 also provides an output signal designated as SR for use within the circuitry to be hereinafter described in more detail.

The control pulses used in generating the timing signals for executing the various "steps" of the "data processing" cycle to be hereinafter described in more detail, are generated by the circuitry illustrated in FIG. 11. Referring thereto, the Clock Pulse (CP) signal from the circuit of FIG. 12 is applied to the Clock input terminal of a 4-bit Up Counter 130. The Enable terminal of the Counter 130 is tied to the positive potential. The Reset terminal of the Counter 130 is connected to receive a Reset RST signal which is generated within the "test" circuitry (not illustrated), and which is used only for test purposes. The Q0 signal output of the Counter 130 is connected to the Clock input terminal of a D Flip Flop 131. The Set input terminal of the Flip Flop 131 is connected to the positive potential, and the Reset input terminal of the Flip Flop 131 is connected to receive the RST signal. The Q output terminal of the Flip Flop 131 is connected to first input terminals of NAND Gates 132 and 133.

The Q1 output terminal of the Counter 130 is connected by means of an Inverter 134 in series with a Resistor 135 to a first input terminal of a NAND Gate 136 and to first and second input terminals of a NOR Gate 137. The Q1 output signal from the Counter 130 is also directly connected to a second input terminal of the NAND Gate 136, which provides a signal output to the Clock input terminal of a 4-bit Up Counter 138. A Capacitor 139 is connected between the reference potential and the second input terminal of the NAND Gate 136. The third and fourth input terminals of the NOR Gate 137 are connected respectively to receive signals designated INB and INA, generated elsewhere in the circuitry as hereinafter described. The NOR Gate 137 provides a signal input to the Data input terminal of the Flip Flop 131.

The Enable input terminal of the Counter 138 is connected to receive a $\overline{WT}$ (Weight) signal generated elsewhere in the circuitry as hereinafter described, and the Reset input terminal of the Counter 138 is connected to receive the RST signal generated in the test portion of the circuitry.

The Q0 output terminal of the Counter 138 is connected by means of an Inverter 140 to enable energization of an Indicator Lamp 141 through a Resistor 142. The Q1 output terminal is connected by means of an Inverter 143 to energize an Indicator Lamp 144 through a Resistor 145. The Q2 output terminal of the Counter 138 is connected by means of an Inverter 146 to energize an Indicator Lamp 147 through a Resistor 148. The Q3 output terminal of the Counter 138 is connected by means of an Inverter 149 to energize an Indicator Lamp 150 through a Resistor 151.

The Q3 output terminal is also connected by means of the Inverter 149 to a second input terminal of the NAND Gate 133, and is directly connected to a second input terminal of the NAND Gate 132. The signal output terminal of the NAND Gate 133 is connected to a D input terminal of Decoder 152. D input terminal is used as an enable for the decoder. The Q0, Q1 and Q2 output terminals of the Counter 138 are directly connected to the A, B and C Data input terminals of the Decoder 152, as well as to the A, B and C Data input terminals of a Decoder 153. The NAND Gate 132 provides a signal input to the D (Enable) input terminal of the Decoder 153.

The Decoders 152 and 153 comprise a network for forming sixteen pulses used for initiating activity within individual "steps" of the data processing cycle to be hereinafter described. The 0 through 7 signal outputs of the Decoder 152 form the "S0P" through "S7P" signals, and the 0 through 7 signal outputs of the Decoder 153 form the "S8P" through "S15P" signals.

The Q0, Q1 and Q2 signal output terminals of the Counter 138 also respectively are connected to the A, B and C Data input terminals of Decoders 154 and 155. The Q3 output of the Counter 138 provides an input signal to the D (Enable) input terminal of the Decoder 154, and the inverted Q3 output signal from the Counter 138 provides an enable signal to the D input terminal of the Decoder 155. The 0 through 7 output terminals of the Decoder 154 carry the "S0" through "S7" system signals, and the 0 through 7 output terminals of the Decoder 155 carry the "S8" through "S15" system signals. The S0 through S15 system signals represent the sixteen "steps" of the date processing cycle.

Figure 5:
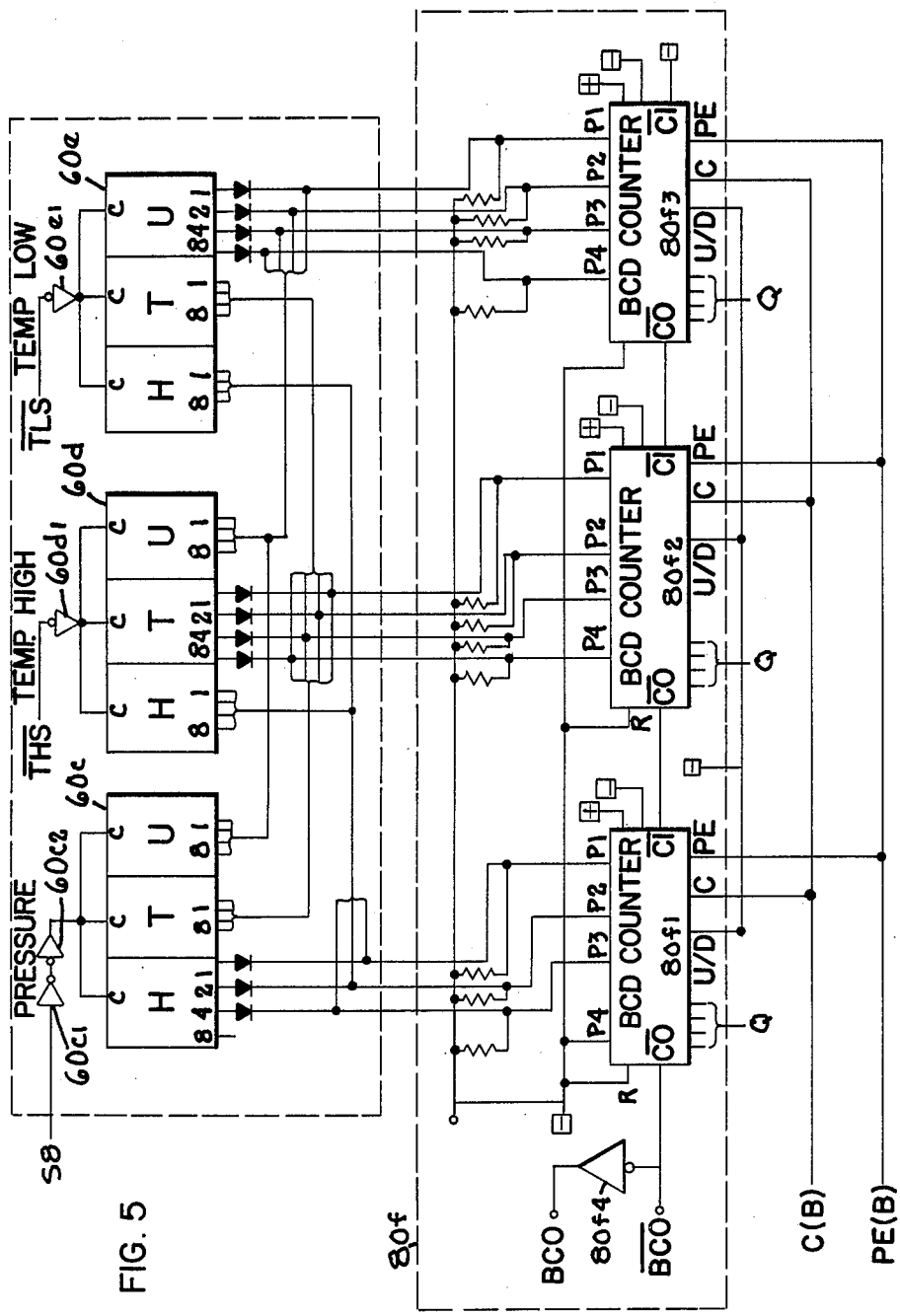
FIG. 5 is a schematic diagram illustrating the Pressure and Temperature switches disclosed in FIG. 3 and the B Register portion of the block diagram circuit illustrated in FIG. 4.

Referring to FIG. 5, the Pressure thumb-wheel switch 60c, the High Temperature thumb-wheel switch 60d and the Low Temperature thumb-wheel switch 60e are schematically illustrated. Each of these switches comprises three digits elements, indicated respectively as "H" (for Hundreds), "T" (for Tens) and "U" (for Units). Each of the three segments of the respective thumb-wheel switches has four data outputs designated by the numerals "8", "4", "2" and "1" respectively. The data output of each of the "H" segments are tied together through blocking diodes as indicated in the figure, with respective numerical designations of the respective switches being tied to one another. Likewise, the respective data outputs of the "T" segments are connected to one another through the blocking diodes, and the respective data output terminals of the "U" segments of the three switches are connected to one another through similar blocking diodes.

The Clock input terminals of the three segments of the Pressure switch 60c are energized by the S8 step signal through a pair of buffer Inverters 60c1 and 60c2. The Clock input terminals of the three segments of the High Temperature setting switch 60d are energized by means of a $\overline{THS}$ signal through an Inverter 60d1. The Clock input terminals of the Low Temperature switch are energized by means of a $\overline{TLS}$ signal through an Inverter 60e1.

Signal outputs from the three thumb-wheel setting switches 60c, 60d and 60e are transmitted to the B Register 80f. The B Register 80f comprises three binary coded decimal Counters 80f1, 80f2 and 80f3. The "1", "2", "4" and "8" output signals from the Units (U) segments of the thumb-wheel switches are directly connected to the P1, P2, P3 and P4 Data input terminals of the BCD Counter 80f3. The $\overline{CI}$ (Carry-In Not) of the Counter 80f3 as connected to the reference potential period. The input signals provided to the input terminals P1-P4 of the Counter 80f3 are buffered by the Resistor network associated respectively with the input lines.

The "1", "2", "4" and "8" signal outputs from the Tens (T) segments of the thumb-wheel switches are directly connected to the P1, P2, P3 and P4 input terminals of the Counter 80f2. The $\overline{CI}$ terminal of the Counter 80f2 is connected to the $\overline{CO}$ (Carry Out Not) terminal of the Counter 80f3. The input signal supplied to the Counter 80f2 are also buffered by the Resistor network illustrated in FIG. 5.

The "1", "2" and "4" signal outputs from the Hundreds (H) segments of the thumb-wheels are directly applied to the P1, P2 and P3 input terminals of the Counter 80f1. These signals are also buffered by the Resistor network indicated. The CI terminal of the Counter 80f1 is directly connected to the $\overline{CO}$ output terminal of the Counter 80f2. The Reset terminals of the Counter 80f1, 80f2 and 80f3 are all tied to the reference potential, as well as the P4 input terminal of the Counter 80f1. In the preferred embodiment, the Counters 80f1, 80f2 and 80f3 are of the 4510 type. The Q1 through Q4 output terminals of the Counters 80f1, 80f2 and 80f3 are unconnected. The $\overline{CO}$ output terminal of the Counter 80f1 supplies the BCO signal for use elsewhere in the system, and also provides through an Inverter 80f4 a BCO signal.

The U/D input terminals of the Counter 80f1, 80f2 and 80f3 are commonly connected to the reference terminal. The Clock input terminals of the Counters 80f1, 80f2 and 80f3 are also commonly connected for receipt of a C (B) clock signal from the control and logic circuitry hereinafter described. The PE input terminals of the Counters 80f1, 80f2 and 80f3 are also commonly connected to receive a PE (B) signal from the control and logic circuitry hereinafter described.

Figure 20:
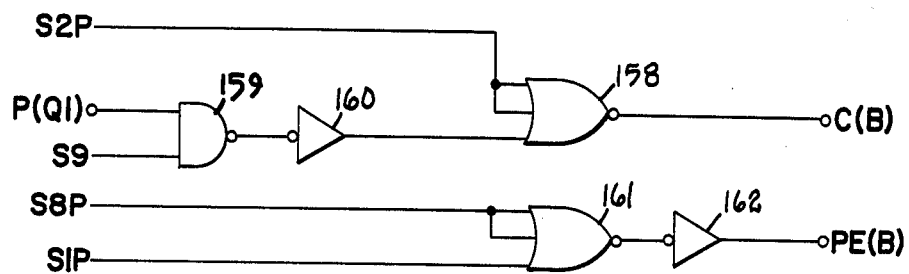
FIG. 20 is a schematic diagram of a portion of the Timing and Logic Circuitry disclosed in FIG. 4, for conditioning signal inputs to the B Register of the control circuits.

Referring to FIG. 20, the signal conditioning circuitry of the Timing and Control circuitry 80a, used to supply the C (B) and the PE (B) signals to the B Counter 80f are illustrated. The S2P signal from the step timing circuits is applied to first and second input terminals of a NAND Gate 158. The S9 signal is applied to a first input terminal of a NAND Gate 159. The second input terminal of the NAND Gate 159 is connected to receive a P (Q1) signal generated elsewhere in the circuitry as hereinafter described. The output signal from the NAND Gate 159 is applied by means of a Inverter 160 to a third input of the NAND Gate 158. The output signal from the NAND Gate 158 comprises the C (B) signal which is applied to the Clock input terminals of the B Register 80f.

The S8P signal is applied to first and second input terminals of a NAND Gate 161. The S1P signal is applied to the third input terminal of the NAND Gate 161. The output signal from the NAND Gate 161 is applied by means of an Inverter 162 to the PE input terminals of the B Register 80f, as the PE (B) signal.

Figure 6:
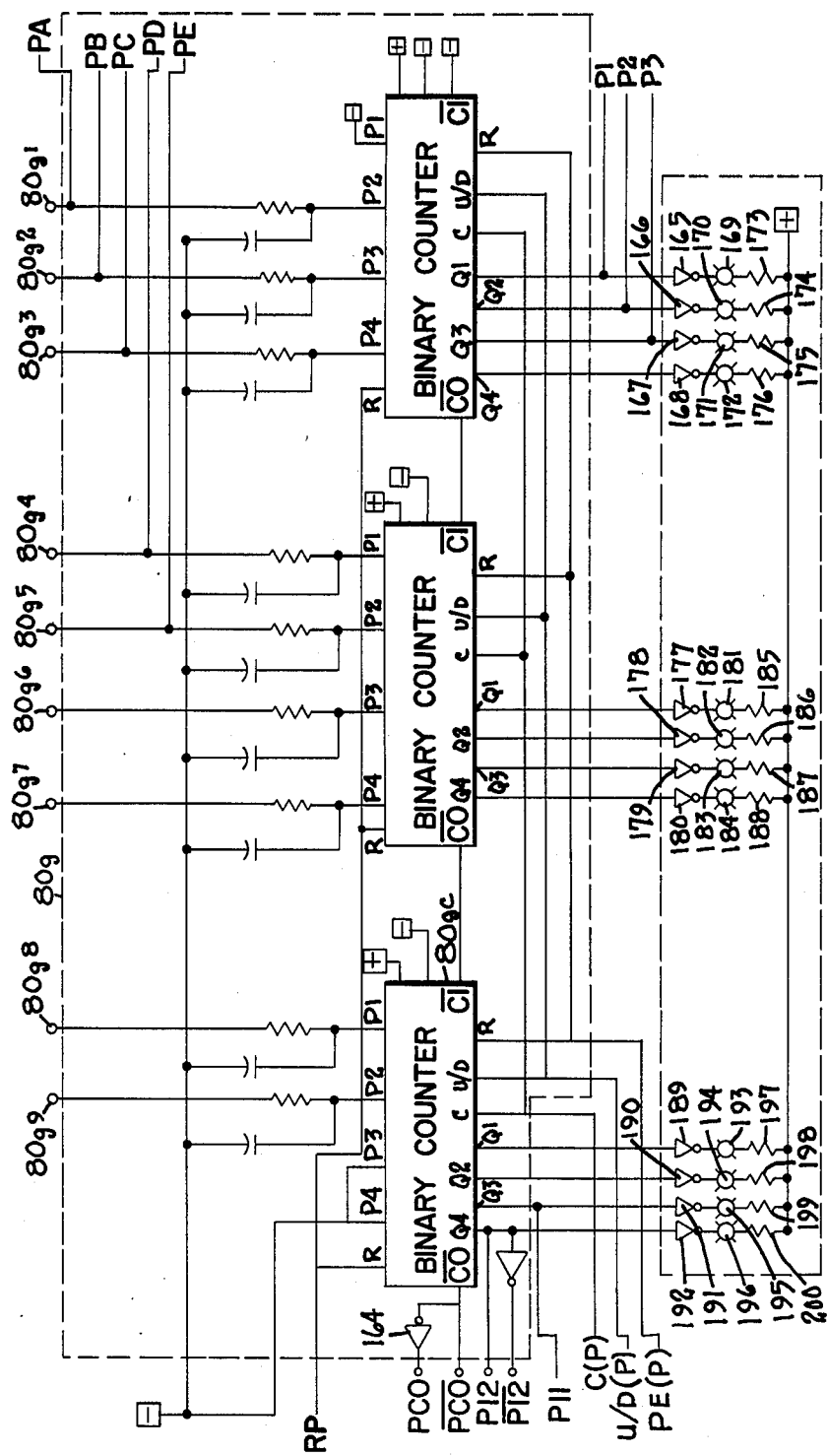
FIG. 6 is a schematic diagram illustrating the P Register and associated visual display, disclosed in block diagram form in FIG. 4.

Referring to FIG. 6, the P Register 80g is indicated. The P Register comprises three binary Counters, which are in the preferred embodiment type 4516 units. The 9-bit Pressure word received from the Interface Module 58 by means of the signal flow path 59f are applied to the terminals designated as 80g1 through 9 respectively, with the least significant digit being received at 80g1 terminal. The 9-bit Pressure word data is buffered, before application to the input terminals of the binary Counters by the Resistor and Capacitor networks illustrated in FIG. 6. One terminal each of the buffering Capacitors is tied to the reference terminal. For ease of reference, the three binary Counters will be referred to as 80gA, 80gB and 80gC.

The first three bits (80g1–80g3) of the Pressure word received from the signal flow path 59f are respectively applied to the P2, P3 and P4 Data input terminals of the Counter 80gA. The P1 input terminal of the Counter 80gA is connected to the reference terminal. The $\overline{CI}$ input terminal of the Counter 80gA is connected to the reference terminal.

The fourth through seventh (80g4–80g7) bits of the Pressure word are respectively applied to the P1–P4 Data input terminals of the Counter 80gB. The $\overline{CI}$ input terminal of the Counter 80gB is connected to the $\overline{C0}$ output terminal of the Counter 80gA.

The eighth and ninth (80g8 and 80g9) bits of the Address word are respectively applied to the P1 and P2 Data inputs of the Counter 80gC. The P3 and P4 Data input terminals of the Counter 80gC are connected to the reference potential. The $\overline{CI}$ terminal of the Counter 80gC is connected to the $\overline{C0}$ output terminal of the Counter 80gB. The Reset input terminals of the Counters 80gA–80gC are respectively connected to receive the RP system signal. The $\overline{C0}$ input terminal of the Counter 80gC forms the Carry Out output of the B Register 80g and comprises the $\overline{PCO}$ system signal. The signal from the $\overline{C0}$ terminal of the 80gC Counter is also inverted by means of an Inverter 164 to form the $\overline{PCO}$ system signal.

The first (or lower) 5-bits of the Address word received at the input terminals 80g1 through 80g5 respectively form the PA through PE system signals.

The U/D input terminals of the Counters 80gA through 80gC are commonly connected to one another and to receive a U/D (P) signal from the Timing and Control circuitry to be hereinafter described. The Clock input terminals of the Counters 80gA–80gC are commonly connected together and to receive a C (P) clock signal from the Timing and Control circuitry to be hereinafter described. The PE input terminals of the Counters 80gA–80gC are commonly connected together and to receive the PE (P) signal from the Timing and Control circuits to be hereinafter described.

The Q1 through Q4 output terminals of the Counter 80gA are respectively connected by means of Inverters 165–168, to energize Indicator Lamps 169–172 through Resistors 173–176 respectively. The signal output from the Q1 output terminal of the Counter 80gA comprises the P1 system signal, the output signal from the Q2 output terminal of the Counter 80aA comprises the P2 system signal and the output signal from the Q3 terminal of the Counter 80gA comprises the P3 system signal.

The output terminals Q1 through Q4 respectively of the Counter 80gB are connected by means of Inverters 177–180, to energize Indicator Lamps 181–184 through Resistors 185–188.

The output terminals Q1–Q4 of the Counter 80gC are connected through Inverters 189–192, to energize Indicator Lamps 193–196 through Resistors 197–200. The output signal from the Q4 terminal of the Counter 80gC comprises the $\overline{P12}$ system signal, and is inverted by means of an Inverter 201 to form the system $\overline{P12}$ signal. The signal output from the Q3 terminal of the Counter 80gC forms the P11 system signal.

Figure 17:
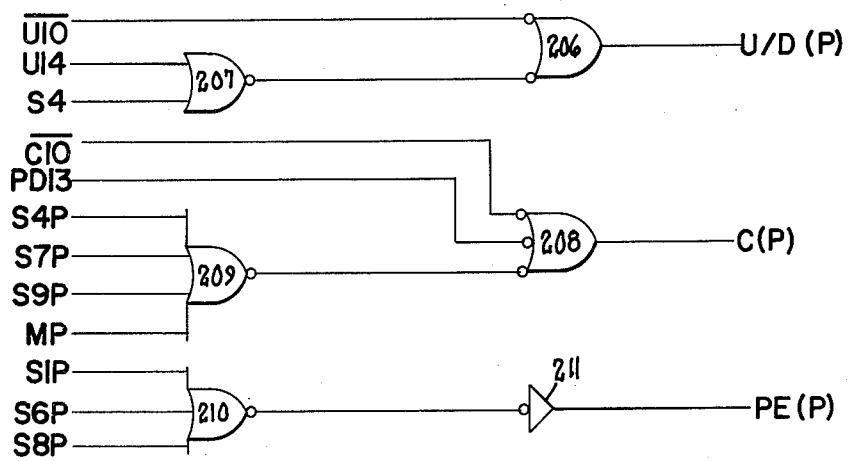
FIG. 17 is a schematic diagram of a portion of the logic circuitry associated with the timing input to the P Register, and forming a portion of the Internal Control Circuits disclosed in FIG. 4.

Referring to FIG. 17, the Logic and Control circuits used for providing the timing signals to the P Register 80g are illustrated. The system signal U10 is applied to a first input terminal of a NAND Gate 206. The system signal U14 is applied to a first input terminal of a NOR Gate 207. The system signal S4 is applied to a second input terminal of the NOR Gate 207, whose output signal is applied to the second input terminal of NAND Gate 206. The output signal of the NAND Gate 206 forms the U/D (P) signal applied to the U/D input terminals of the P Register.

The C10 system signal is applied to a first input terminal of a NAND Gate 208. The system signal PD13 is applied to a second input terminal of the NAND Gate 208. System signals S4P, S7P, S9P and MP respectively are applied to the four input terminals of the NOR Gate 209. The signal output from the NOR Gate 209 is applied to the third input terminal of the NAND Gate 208. The output signal from the NAND Gate 208 comprises the C (P) Clock signal for the P Register.

The S1P, S6P and S8P system signals are respectively applied to the three input terminals of a NOR Gate 210. The signal output from the NOR Gate 210 is inverted by means of an Inverter 211 to form the PE (P) signal input for the PE input terminals of the P Register.

Figure 7:
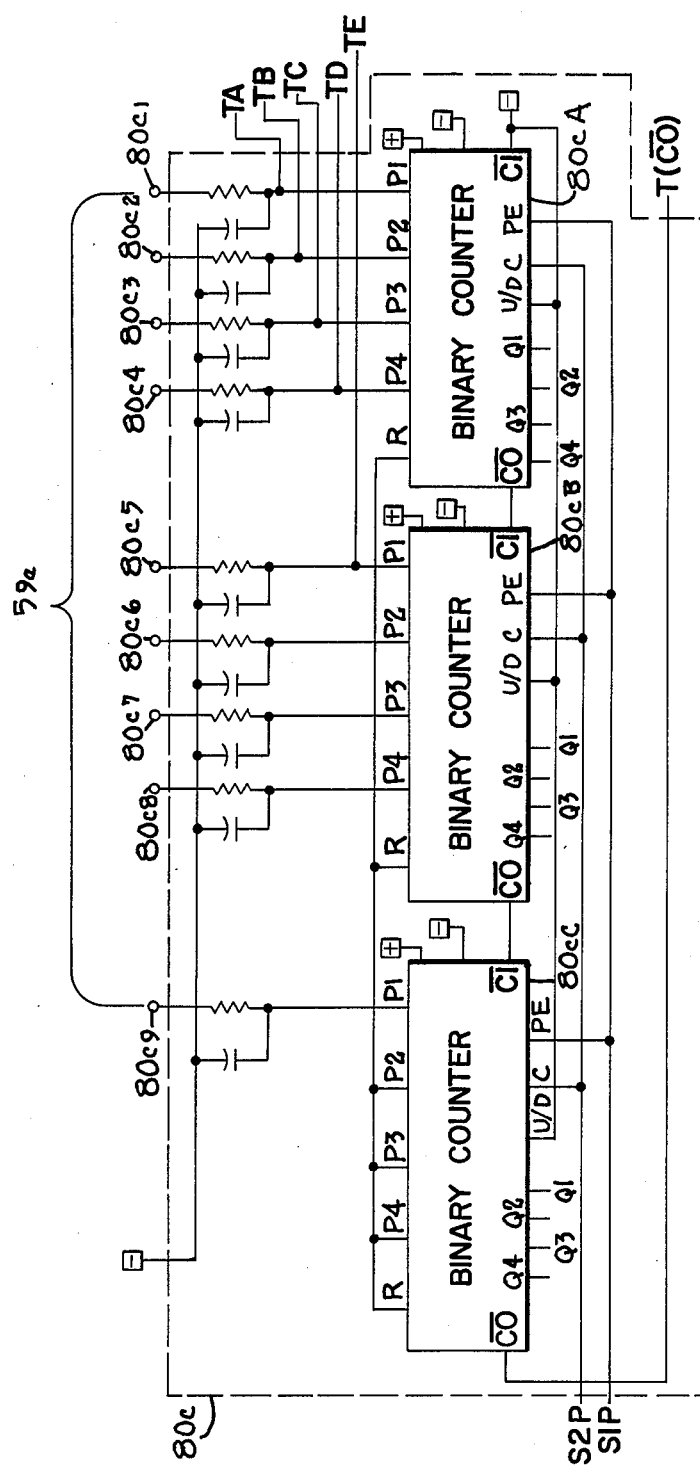
FIG. 7 is a schematic diagram illustrating the T Register portion of the block diagram disclosed in FIG. 4.

Referring to FIG. 7, the T Register 80c circuitry is illustrated. The T Register basically comprises three binary Counters (in the preferred embodiment of the 4516 type), and designated as 80cA, 80cB and 80cC respectively. The T Register is connected to receive the 9-bit Temperature word from the Interface Module 58 by means of the signal flow path 59e. The 9-bit Temperature word is received at input terminals 80c1 through 80c9 respectively, with the 80c1 terminal receiving the least significant bit of the Temperature word. The 9-bit Temperature word is buffered by means of the Resistor and Capacitor buffering circuits indicated in FIG. 7, wherein the buffering Capacitors are tied to the negative potential.

The four least significant Temperature data bits received on the 80c1–80c4 input terminals respectively are applied respectively to the P1–P4 Data input terminals of the binary Counter 80cA. The $\overline{CI}$ terminal of the Counter 80cA is connected to the reference potential. The $\overline{C0}$ output terminal of the Counter 80CA is connected to the $\overline{CI}$ input terminal of the Counter 80cB.

The fifth through eighth Temperature data bits received respectively at input terminals 80c5–80c8 are respectively applied to P1–P4 input terminals of the Counter 80cB. The $\overline{C0}$ output terminal of the Counter 80cB is connected to the $\overline{CI}$ input terminal of the Counter 80CC.

The ninth Temperature data bit received at the input terminal 80c9 is applied to the P1 input data terminal of the Counter 80cC. The P2, P3 and P4 data terminals of the Counter 80cC, and all of the Reset terminals of the Counters 80cA, 80cB and 80cC are connected to the reference potential. The $\overline{C0}$ output terminal of the Counter 80cC is provided as an output signal T ($\overline{C0}$).

The U/D input terminals of the three Counters comprising the T Register 80c are commonly connected to one another and to the reference potential. The clock input terminals of the three Counters comprising the T Register are commonly connected to one another and to receive the S2P system signal. The PE input terminal of the three Counters comprising the T Register are commonly connected to one another and to receive the S1P system signal. The Data output terminals Q1–Q4 of the respective three Counters comprising the T Register are unconnected.

Figure 10:
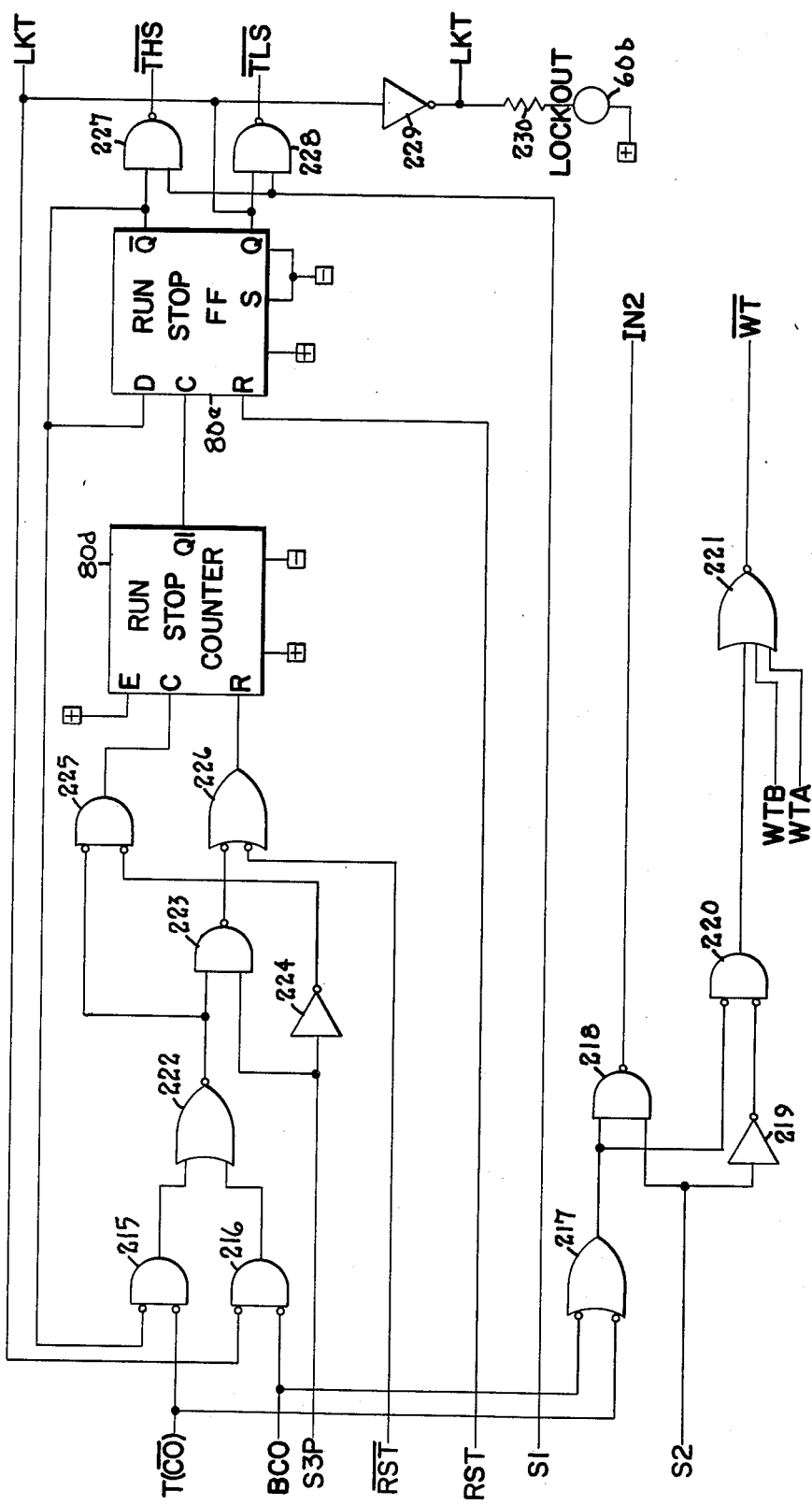
FIG. 10 is a schematic diagram disclosing the Run-Stop Counter and the Run-Stop Flip Flop portions of the network disclosed in FIG. 4, with associated logic and control circuitry.

Referring to FIG. 10, the Run Stop Counter 80d and the Run Stop Flip Flop 80e are illustrated, along with the Timing and Control circuitry associated therewith. Referring to FIG. 10, the T ($\overline{C0}$) system signal is applied to a first input terminal of a NOR Gate 215, and is also applied to a first input terminal of a NAND Gate 217. The signal $\overline{BCO}$ is applied to a first input terminal of a NOR Gate 216 and is also applied to the second input terminal of NAND Gate 217. The output signal from the NAND Gate 217 is applied to a first input terminal of a NAND Gate 218. The S2 system signal is applied to the second input terminal of the NAND Gate 218 and is also applied by means of an Inverter 219 to a first input terminal of a NOR Gate 220. The output signal from the NAND Gate 217 is also applied to the second input terminal of the NOR Gate 220. The output signal from the NAND Gate 218 comprises the IN2 system signal.

The output signal from the NOR Gate 220 is applied to a first input terminal of a NOR Gate 221. The system signals WTB and WTA respectively are applied to second and third input terminals of the NOR Gate 221. The output signal from the NOR Gate 221 comprises the $\overline{WT}$ system signal.

The output signals from the NOR Gate 215 and 216 are respectively applied to first and second input terminals of the NOR Gate 222. The output signal from the NOR Gate 222 is applied to a first input terminal of a NAND Gate 223. The S3P system signal is applied to the second input terminal of the NAND Gate 223 and is also applied by means of an Inverter 224 to a first input terminal of a NOR Gate 225. The output signal from the NOR Gate 222 is applied to the second input terminal of the NOR Gate 225.

The output signal from the NOR Gate 225 is directly applied to the Clock input terminal of the Run Stop Counter 80d. In the preferred embodiment, the Counter 80d is a 4-bit Up Counter of the 4520 type. The signal output from the NAND Gate 223 is applied to a first input terminal of a NAND Gate 226. The system $\overline{RST}$ signal is applied to the second input terminal of the NAND Gate 226, whose output signal is applied to the Reset input terminal of the Run/Stop Counter 80d. The Enable input terminal of the Run/Stop Counter 80d is connected to the positive supply.

The Q1 output terminal of the Run/Stop Counter 80d is applied to the Clock input terminal of the Run/Stop Flip Flop 80e. The system RST signal is applied to the Reset input terminal of the Flip Flop 80e. The Q output terminal of the Run/Stop Flip Flop 80e is tied back to its Data input terminal, and is also connected to the second input terminal of the NOR Gate 215. The $\overline{Q}$ output of the Flip Flop 80e is also connected to a first input terminal of a NAND Gate 227.

The S1 system signal if applied to the second input terminal of the NAND Gate 227 and is also applied to a first input terminal of a NAND Gate 228. The output signal of the NAND Gate 227 comprises the THS system signal.

The Q signal output of the Run/Stop Flip Flop 80e is connected to the second input terminal of the NAND Gate 228 and comprises the LKT system signal. The LKT signal is also applied to the second input terminal of the NOR Gate 216, and is further applied by means of an Inverter 229 in series with a Resister 230 to energize the Indicator Lamp entitled LOCKOUT comprising one of the Indicator Lamps 60b on the Control Unit panel 60a. The inverted LKT signal also forms the system $\overline{LKT}$ signal.

Figure 9:
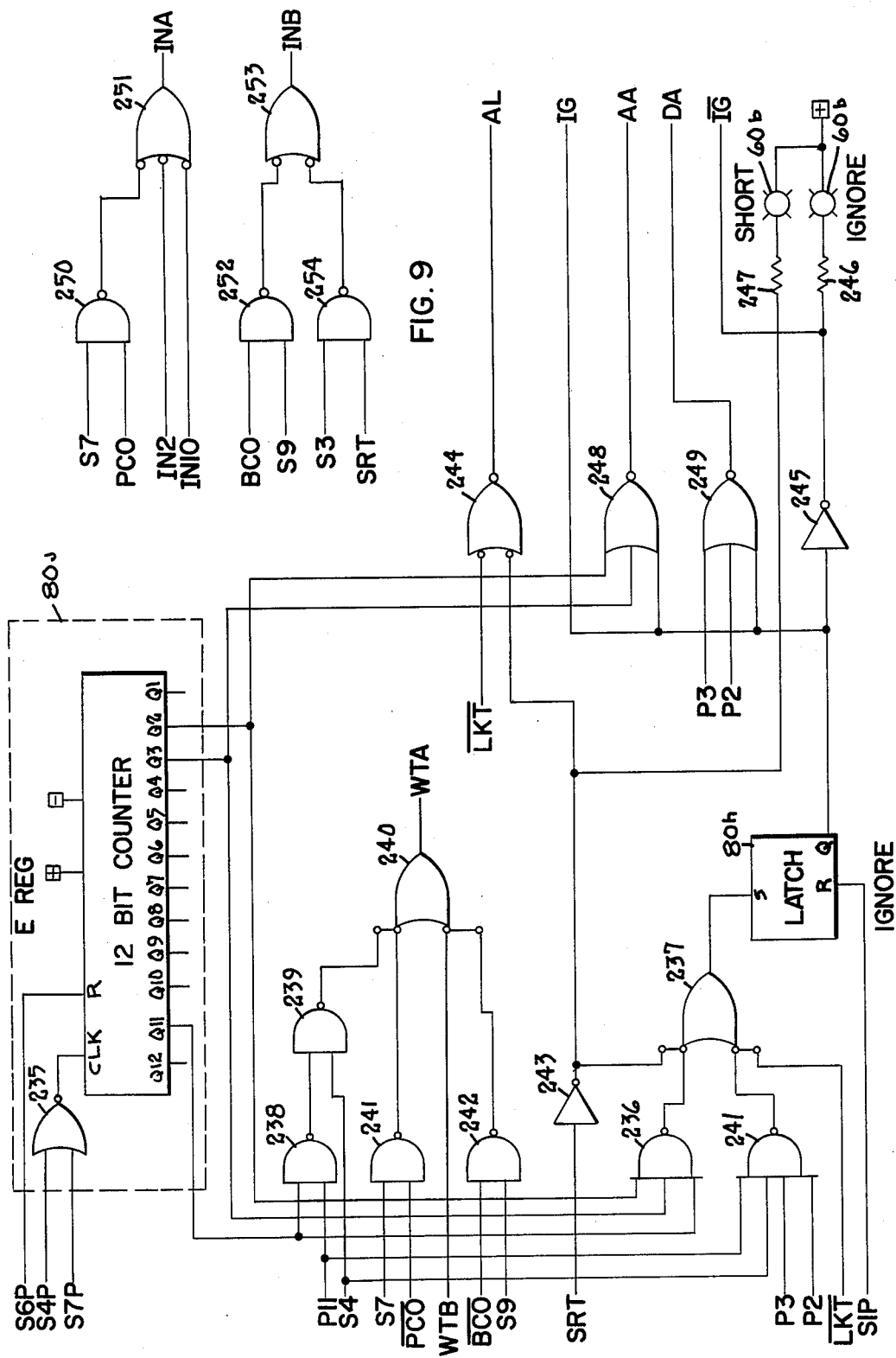
FIG. 9 is a schematic diagram illustrating the E Register and associated logic and control circuitry associated therewith and the Ignore Latch and logic portion of the network disclosed in FIG. 4.

Referring to FIG. 9, the schematic circuitry comprising the E Register 80i, the Ignore Latch 80h and associated control timing and logic circuitry is illustrated. Referring thereto, the E Register basically comprises a 12-bit Up Counter, in the preferred embodiment being a 4040 type. The system signals S4P and S7P respectively are applied to the first and second input terminals of a NOR Gate 235, whose signal output drives the Clock input terminal of the E Register. The S6P system signal is connected to the Reset terminal of the E Register Counter. Of the twelve Data output terminals of the E Register, only the Q2, Q3 and Q11 terminals are connected. The Q3 output of the E Register is connected to a first input terminal of a NAND Gate 236. The Q3 output terminal of the E Register is connected to a second input terminal of the NAND Gate 236, and the Q11 output terminal of the E Register is connected to a third input terminal of the NAND Gate 236. The signal output from the NAND Gate 236 is applied to a first input terminal of a NAND Gate 237.

The Q11 output terminal of the E Register is also connected to a first input terminal of a NAND Gate 238. The P11 system signal is applied to the second input terminal of the NAND Gate 238, the output signal from which is applied to a first input terminal of a NAND Gate 239. The S4 system signal is applied to the second input terminal of the NAND Gate 239, whose output signal is applied to a first input terminal of a NAND Gate 240.

The P11 and S4 system signals are also applied to first and second input terminals of a NAND Gate 241. The P3 and P2 system signals are applied to the third and fourth input terminals of the NAND Gate 241, the output signal of which is applied to a second input terminal of the NAND Gate 237.

The S7 and $\overline{PCO}$ system signals are applied respectively to first and second input terminals of a NAND Gate 242, the output signal of which is applied to a second input terminal of the NAND Gate 240. The WTB system signal is applied to the third input terminal of the NAND Gate 240. The $\overline{BCO}$ and the S9 system signals are applied to first and second input terminals of a NAND Gate 242, the signal output of which is applied to the fourth input terminal of the NAND Gate 240. The output signal of the NAND Gate 240 comprises the WTA system signal.

The SRT system signal is applied by means of an Inverter 243 to a third input terminal of the NAND Gate 237 and is also applied to a first input terminal of a NAND Gate 244. The $\overline{LKT}$ system signal is applied to the fourth input terminal of the NAND Gate 237. The output signal from the NAND Gate 237 is applied to the Set input terminal of the Ignore Latch 80h. In the preferred embodiment, the Latch 80h is of the 4043 type. The S1P system signal is applied to the Reset input terminal of the Ignore Latch 80h.

The Q output terminal of the Ignore Latch 80h is applied by means of an Inverter 245 and a Resistor 246 to energize the IGNORE Indicating Lamp comprising one of the Indicator Lamps 60b on the Control Panel 60a of the Control Unit 60. The inverted SRT signal is applied by means of the Inverter 243 and a Resistor 247 to illuminate the SHORT Indicating Lamp comprising one of the Indicator Lamps 60b of the Control Panel 60. Both the Short and the Ignore Lamps are energized by the positive potential supply.

The $\overline{LKT}$ system signal is applied to the second input terminal of the NAND Gate 244, the output of which comprises the AL system signal.

The Q2 and Q3 output terminals of the E Register are respectively connected to first and second input terminals of a NOR Gate 248. The Q output terminal of the Ignore Latch 80h is connected to the third input terminal of the NOR Gate 248, the output signal of which comprises the AA system signal.

The Q output terminal of the Ignore Latch 80h comprises the system IG signal, and is also applied to a first input terminal of a NOR Gate 249. The P2 and P3 system signals are applied to the second and third input terminals of the NOR Gate 249, the signal output of which comprises the DA system signal. The Q output terminal of the Ignore latch 80h as inverted by the Inverter 245 comprises the $\overline{IG}$ system signal.

Figure 11:
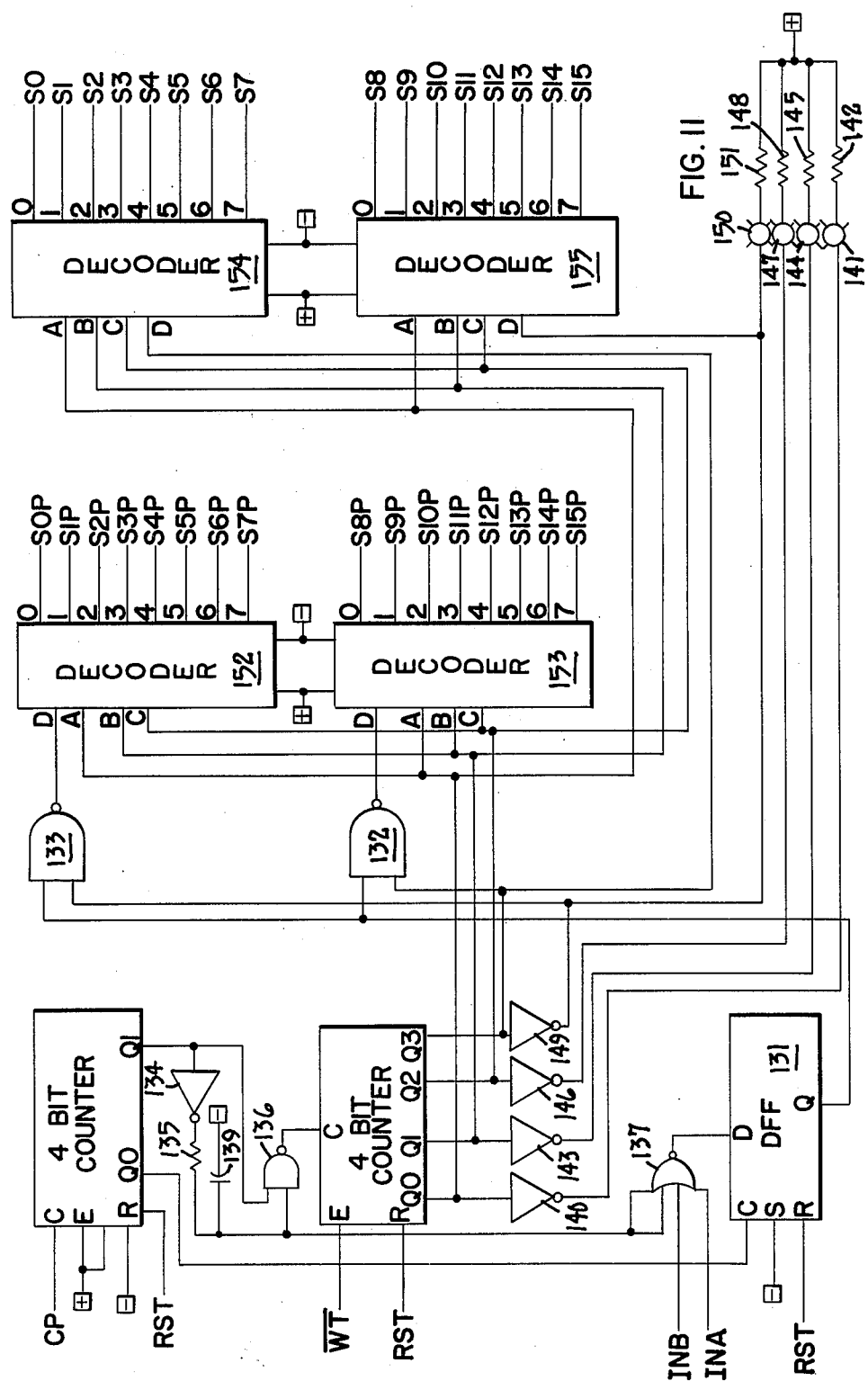
FIG. 11 is a schematic diagram of the Step Generator and Control portion of the Internal Control Circuit portion of the network disclosed in FIG. 4.

The Logic network disclosed in the upper right portion of FIG. 9 comprises the Logic circuitry for generating the 1NB and 1NA signals applied to the Timing circuits of FIG. 11. Referring to FIG. 9, the S7 and PCO signals are applied to first and second terminals of a NAND Gate 250, the output signal of which is applied to a first input terminal of a NAND Gate 251. The IN2 and IN10 system signals are applied to the second and third input terminals of the NAND Gate 251, the output signal of which comprises the INA signal.

The BCO and S9 system signals are applied to first and second input terminals of a NAND Gate 252, the output signal of which is applied to a first input terminal of a NAND Gate 253. The S3 and SRT system signals are applied to first and second input terminals of a NAND Gate 254, the output signal of which is applied to a second input terminal of the NAND Gate 253. The output signal of the NAND Gate 253 comprises the INB logical system signal.

Figure 8:
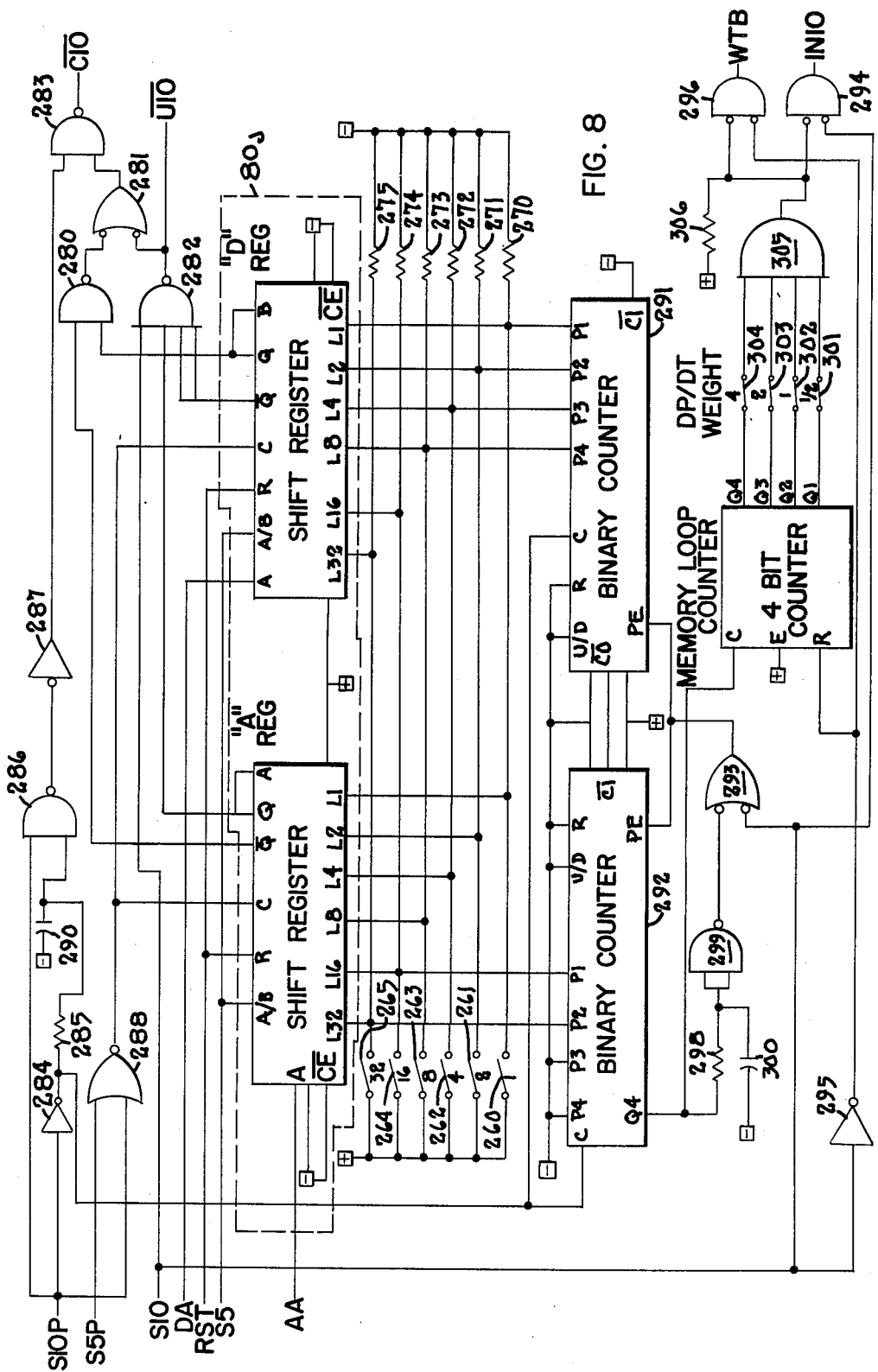
FIG. 8 is a schematic diagram illustrating the A and D Registers and associated control circuitry and the Memory Loop Counter portion of the network disclosed in FIG. 4.

The A and D Registers 80j and associated Control Timing and Logic circuitry is illustrated in FIG. 8. Referring thereto, the A and D Registers are indicated at 80j, as comprising two programmable shift registers, in the preferred embodiment of the 4547 type. Each register has A and B input terminals, programming (i.e. to program the respective lengths thereof) input terminals L1, L2, L4, L8, L16 and L32, and A/B "input select" terminal (i.e. for selecting either the A or B input terminals), Clock input terminal and Q and $\overline{Q}$ output terminals. The Chip Enable ($\overline{CE}$) input terminals of the respective shift registers are tied to the negative potential.

The AA system signal is applied to the A input terminal of the (A Register), and the DA system signal is applied to the A input terminal of the (D Register). The RST system Reset signal is applied to the Reset input terminals of both the A and D Registers. The S5 step timing signal is applied to the A/B input selection terminals of both the A and D Registers.

The A and D shift registers can be varibly programmed from 0 to 64 bits, depending upon the input signals applied to their programmable input terminals (L terminals). Selection of the operative "lengths" of the registers is determined by the settings of the six switches 260–266 respectively. The programmable switches 260–266 determine the "length" of the register according to the weighted numbers of the various switches indicated in FIG. 8 (i.e. "1"–"32"). To determine the operable length of the shift register, the numbers of those switches 260–266 which are "closed" are added together, and the length of the register will equal that total plus one. As illustrated in FIG. 8, the switches 260, 261, 262, 263, 264 and 265 respectively, in combination with their associated Resistors 271–275 respectively provide programmable input information to the L1, L2, L4, L8, L16 and L32 programmable input terminals of the A and D Register.

The Q output terminal of the D Register is connected to the B Date input terminal of the D Register, and is also applied to a first input terminal of a NAND Gate 280. The $\overline{Q}$ output terminal of the A Register is applied to the second input terminal of the NAND Gate 280. The output signal of the NAND Gate 280 is applied to a first input terminal of a NAND Gate 281.

The $\overline{Q}$ output terminal of the D Register is connected to a first and second input terminals of a NAND Gate 282. The Q output terminal of the A Register is connected to the third input terminal of the NAND Gate 282, as well as to the B Data input terminal of the A Register. The S10 system signal is connected to the fourth input terminal of the NAND Gate 282. The output signal from the NAND Gate 282 is applied to the second input terminal of the NAND Gate 281, and also comprises the U10 system signal. The output signal of the NAND Gate 281 is applied to a first input terminal of a NAND Gate 283. The S10P signal is applied by means of an Inverter 284 and a Resistor 285 to a first input terminal of a NAND Gate 286. The S10P signal is also directly applied to a second input terminal of the NAND Gate 286, the output signal of which is applied by means of an invertor 287 to the second input terminal of the NAND Gate 283. The output signal of the NAND Gate 283 comprises the $\overline{C10}$ signal output of the control network.

The S10P signal is also applied to a first input terminal of a NOR Gate 288. The S5P step timing signal is applied to the second input terminal of the NOR Gate 288. The output signal of the NOR Gate 288 is applied to the Clock input terminals of the A and D Registers. A capacitor 290 is connected between the referenced supply and the first input terminal of the NAND Gate 286.

The L1, L2, L4, and L8 programmable input terminals are also directly connected to the P1, P2, P3, and P4 date input terminals of the binary counter 291. The L16 and L32 programmable input terminals of the A Register are directly connected to the P1 and P2, respectively, data input terminals of the binary counter 92. In the preferred embodiment, the binary counters 291 and 292 count down and are of the 4516 type. The P3 and P4 data input terminals of the counter 292 come out of the U/D input terminals of the counters 291 and 292 and the Reset input terminals of the counters 291 and 292 are all commonly connected to the common or reference potential. The $\overline{CI}$ terminal of the counter 291 is connected to the reference potential, and the $\overline{CO}$ output terminal of the counter 291 is connected to the $\overline{CI}$ input terminal of the counter 292. The inverted S10P signal as applied by the invertor 284 is connected to the Clock input terminals of both the counters 291 and 292.

The S10 step signal is directly applied to a first input terminal of a NAND Gate 293, is applied to a first input terminal of a NOR Gate 294. The S10 signal is also inverted by means of an invertor 295. The inverted S10 signal is applied to the Reset input terminal of a 4-bit binary up counter designated as a Memory Loop Counter. The inverted S10 signal is also applied to a first input signal of a NOR Gate 296.

The Q4 output terminal of the binary counter 292 is connected to apply a Clock signal to the Clock input terminal of the Memory Loop Counter 297. The output signal from the Q4 terminal of the counter 292 is also applied by means of a resistor 298 and a NAND Gate 299 to the second input terminal of the NAND Gate 293. The output signal from the NAND Gate 293 provides an input signal to the PE input terminals of both the counters 291 and 292. A capacitor 300 is connected between the negative potential and the input terminals to the NAND Gate 299.

In a preferred embodiment of the 4-bit counter 297 is a type 4520 binary counter. The Enable input terminal of the counter 297 is directly connected to the positive potential.

Memory Loop Counter 297 maintains a count of the data stored within the memory or combined A and D Registers. The Loop Counter 297 has dat output terminals Q1, Q2, Q3, and Q4 respectively connected by means of four DP/DT Weight switches designated as 301–304 respectively, two four input terminals of an AND Gate 305. The four DP/DT Weight switches 301–304 respectively, have assigned "values" of: $\frac{1}{2}$, 1, 2, and 4, respectively. These switches in combination enable the setting of a "constant" or "weight factor" to be applied to the cumulative "counts" of data within the memory 80j when determining the value to be given to the control output signal of the control unit 60 following each data processing cycle.

The AND Gate 305 provides a signal output to the second input terminals of the NOR Gate 294 and 296. A resistor 306 is also connected between the positive voltage supply and the second input terminal of the NOR Gate 296. The output signal of the NOR Gate 294 forms the IN10 control systems signal and the output signal of the NOR Gate 296 forms the WTB control signal.

Figure 18:
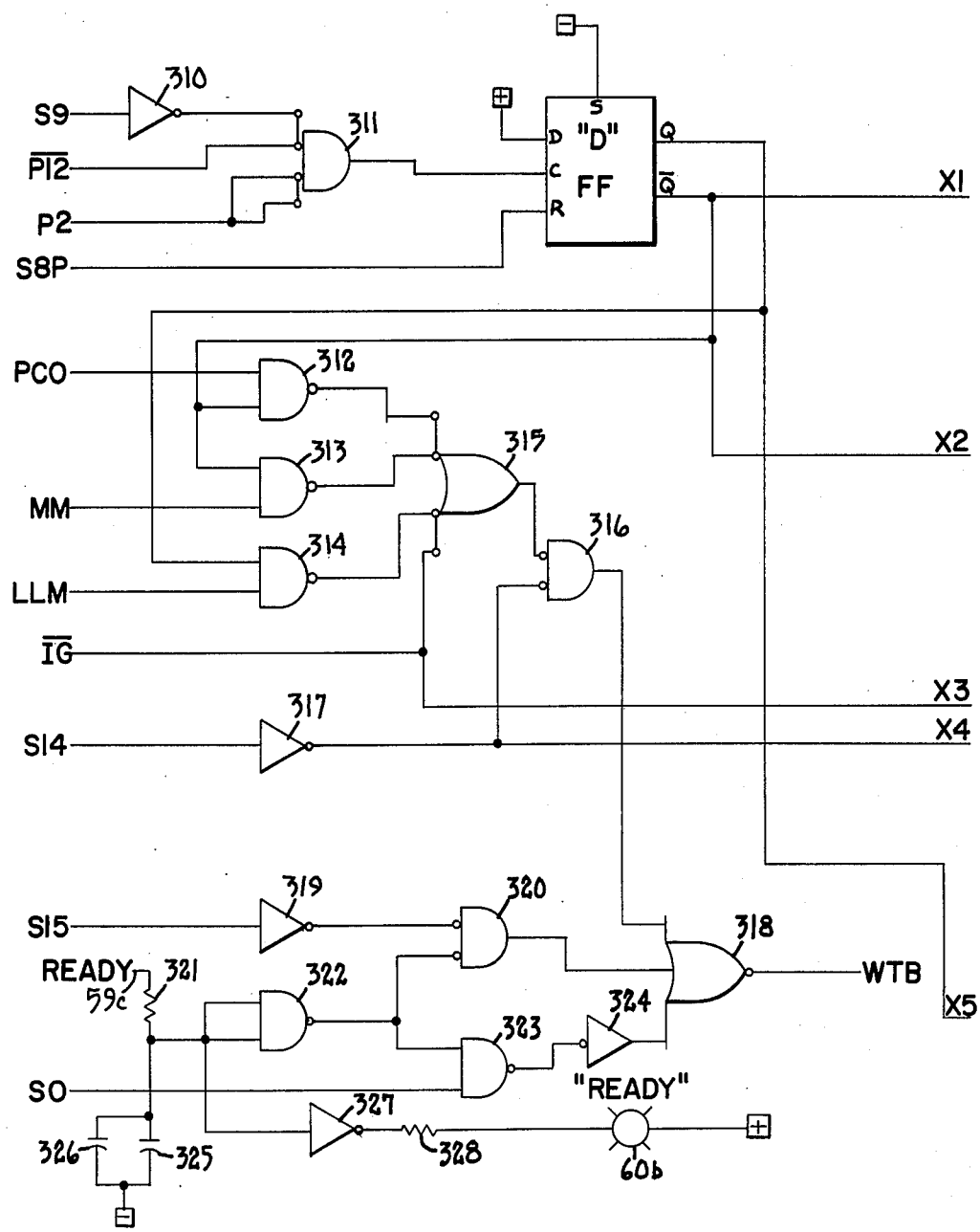
FIG. 18 is a schematic diagram of the Low Limit Flip Flop portion of the network disclosed in FIG. 4, with associated control and timing circuitry.
Figure 19:
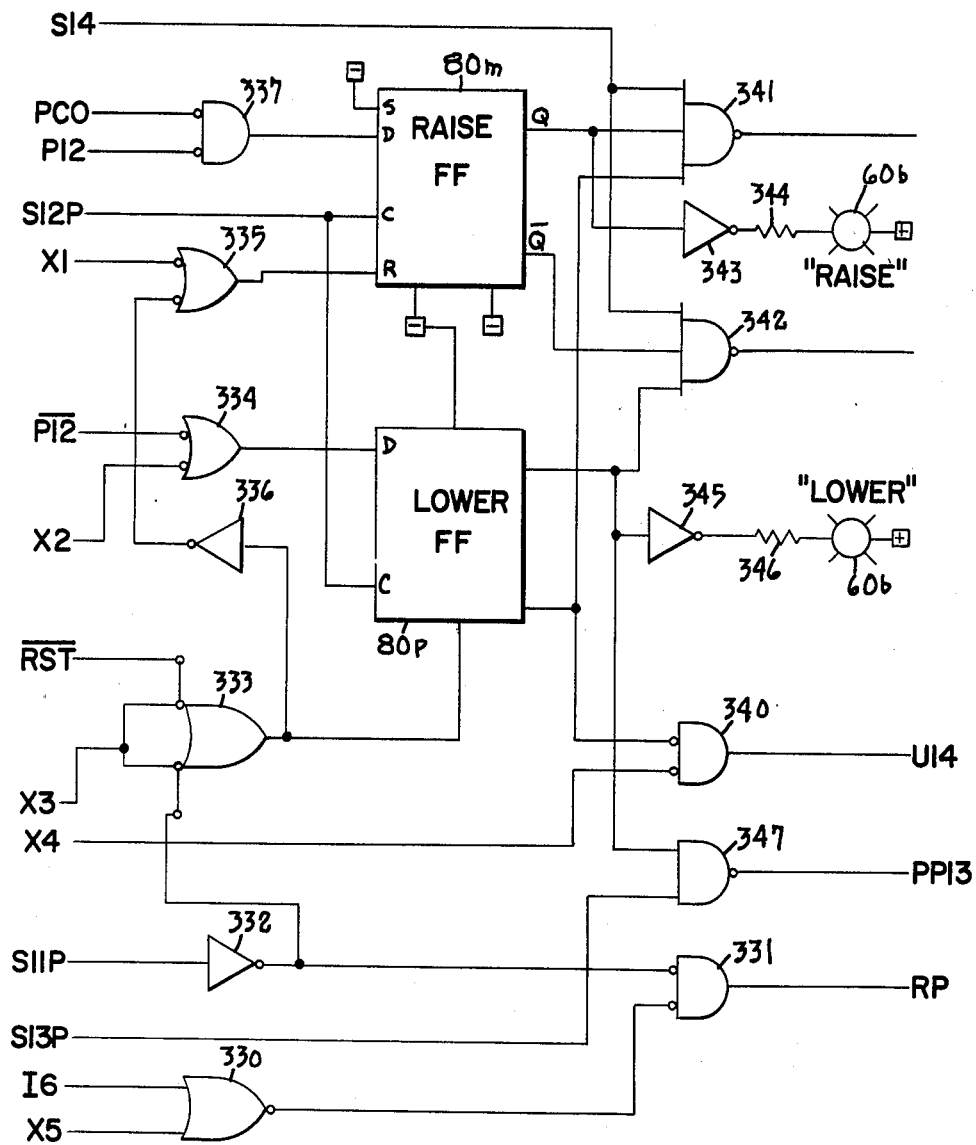
FIG. 19 is a schematic diagram of the Raise and Lower Flip Flop portions of the network disclosed in FIG. 4, with associated logic forming a part of the Internal Control Circuit.

The Low Limit Flip Flop 80k, the Raise Flip Flop 80n, the Lower Flip Flop 80p and their associated control and timing logic and circuitry are collectively disclosed in FIGS. 18 and 19. The schematic diagrams of FIGS. 18 and 19 are intended to be read together and placed side-by-side so as to form one composite circuit network. Referring collectively to FIGS. 18 and 19, the S9 step signal is applied by means of an invertor 310 to a first signal input of a NOR Gate 311. The $\overline{P12}$ signal is applied to a second input terminal of the NOR Gate 311 and the P2 signal is applied to the third and fourth input terminals of the NOR Gate 311. The output signal of the NOR Gate 311 is applied to the Clock input terminal of the Low Limit Flip Flop 80k, which is a D type Flip Flop of the 4013 type.

The S8P signal is applied to the Reset input terminal of the Flip Flop 80k. The Data and Set input terminals of the Flip Flop 80k are respectively tied to the positive and negative supply potentials.

The PCO signal is applied to a first input terminal of a NAND Gate 312, and the MM system signal is applied to a first input terminal of a NAND Gate 313. The LLM system signal is applied to a first input signal of a NAND Gate 314. The $\overline{Q}$ signal output of the Low Limit Flip Flop 80k is applied to the second input terminals of the NAND Gate 312 and 313. The Q output terminal of the Flip Flop 80k is applied to the second input terminal of the NAND Gate 314. The output signals of the NAND Gates 312, 313, and 314 are respectively applied to first, second and third input terminals of a NAND Gate 315. The $\overline{IG}$ system signal is applied to the fourth input terminal of the NAND Gate 315. The output signal of the NAND Gate 315 is applied to a first input terminal of a NOR Gate 316. The step signal S14 is applied by means of an invertor 317 to the second input terminal of the NOR Gate 316. The output signal from the NOR Gate 316 is applied to a first input signal of a NOR Gate 318.

The step signal S15 is applied by means of an invertor 319 to a first input terminal of a NOR Gate 320. The Pressure and Temperature READY signal received from the Interface Module 58 by means of the signal flow path 59c is applied by means of a resistor 321 to first and second input terminals of a NAND Gate 322. The output signal of the NAND Gate 322 is applied to the second input terminal of the NOR Gate 320, the signal output of which is applied to the second input terminal of the NOR Gate 318. The output signal from the NAND Gate 322 is also applied to a first input terminal of a NAND Gate 323. The S0 system signal is applied to the second input terminal of the NAND Gate 323. The output signal from the NAND Gate 323 is applied by means by means of an invertor 324 to the third input terminal of the NOR Gate 318. The output signal of the NOR Gate 318 comprises the WTB signal for the control module.

The negative potential supply is connected to a pair of capacitors 325 and 326 connected in parallel, to the input terminals of the NAND Gate 322. The Pressure and Temperature READY signal is also applied by means of the resistor 321 and an ivnertor 327 in series with a resistor 328 to enable elimination of the READY indicator lamp forming one of the indicator lamps 60b on the control module panel 60a. The READY lamp 60b is energized by means of the positive supply.

The Q output terminal of the Low Limit Flip Flop 80k is connected by means of a conductor X5 to a first input terminal of a NOR Gate 330 (FIG. 19). The IG system signal is connected to the second input terminal of the NOR Gate 330, the output signal of which is applied to the first input terminal of a NOR Gate 331. The S11P step pulse signal is applied by means of an invertor 332 to the second input terminal of the NOR Gate 331 and is also applied by means of the invertor 332 to a first input terminal of a NAND Gate 333. The output signal of the NOR Gate 331 comprises a RP system signal.

The $\overline{IG}$ signal is also directly applied by means of the conductor X3 to second and third input terminals of the NAND Gate 333. A $\overline{RST}$ system signal is applied to the fourth input terminal of the NAND Gate 333. The output signal of the NAND Gate 33 is applied to the Reset input terminal of the Lower Flip Flop 80p.

The $\overline{Q}$ output of the Low Limit Flip Flop 80k is connected by means of the conductor X2 to a first input terminal of a NAND Gate 334. The $\overline{P12}$ system signal is connected to the second input terminal of the NAND Gate 334, the output signal of which is connected to the Data input terminal of the Lower Flip Flop 80p.

The $\overline{Q}$ output terminal of the Low Limit Flip Flop 80k is connected by means of the conductor X1 to a first input terminal of a NAND Gate 335. The output signal from the NAND Gate 33 is connected by means of a convertor 336 to the second input terminal of the NAND Gate 335. The output signal of the NAND Gate 335 is connected to the Reset input terminal of the Raise Flip Flop 80n. The Raise and Lower Flip Flops 80n and 80p respectively are both D-type flip flops of the 4013 type.

The S12P step pulse signal is applied directly to the Clock input terminals of both the Raise and Lower Flip Flops 80n and 80p respectively.

The PCO and the P12 signals are applied by means of a NOR Gate 337 to the Data input terminal of the Raise Flip Flop 80n. The Set input terminals of both the Raise and Lower Flip Flops 80n and 80p are connected to the negative potential.

The S14 signal as inverted by the invertor 317 is also applied by means of the conductor X4 to a first input terminal of a NOR Gate 340. The Q output terminal of the Lower Flip Flop 80p is connected to the second input terminal of the NOR Gate 340, and is also connected to a first input terminal of a NAND Gate 341. The output signal of the NOR Gate 340 comprises the U14 control systems signal.

The S14 signal is applied to first input terminals, respectively, of the NAND Gate 341 and a NAND Gate 342. The $\overline{Q}$ up terminal of the Raise Flip Flop 80n is connected to the third input terminal of the NAND Gate 341, the signal output of which comprises the $\overline{I}$ system signal.

The signal from the Q output terminal of the Raise Flip Flop 80n is also applied by means of an invertor 343 and a resistor 344 to enable energization of the RAISE lamp 60b, forming one of the indicators on the control panel 60a of the control unit 60. The RAISE lamp is energized form the positive supply.

The $\overline{Q}$ output terminal is also connected to a second input terminal of the NAND Gate 342. The Q output terminal of the Lower flip Flop 80p is connected to the third input terminal of the NAND Gate 342, the output signal of which comprises the $\overline{D}$ system signal.

The Q output terminal of the Lower Flip Flop 80p is connected by means of an invertor 345 and a resistor 346 to enable energization of a LOWER indicator lamp 60b, forming one of the indicator lamps on the control panel 60a (FIG. 3). The LOWER lamp is energized from the positive supply.

Figure 13:
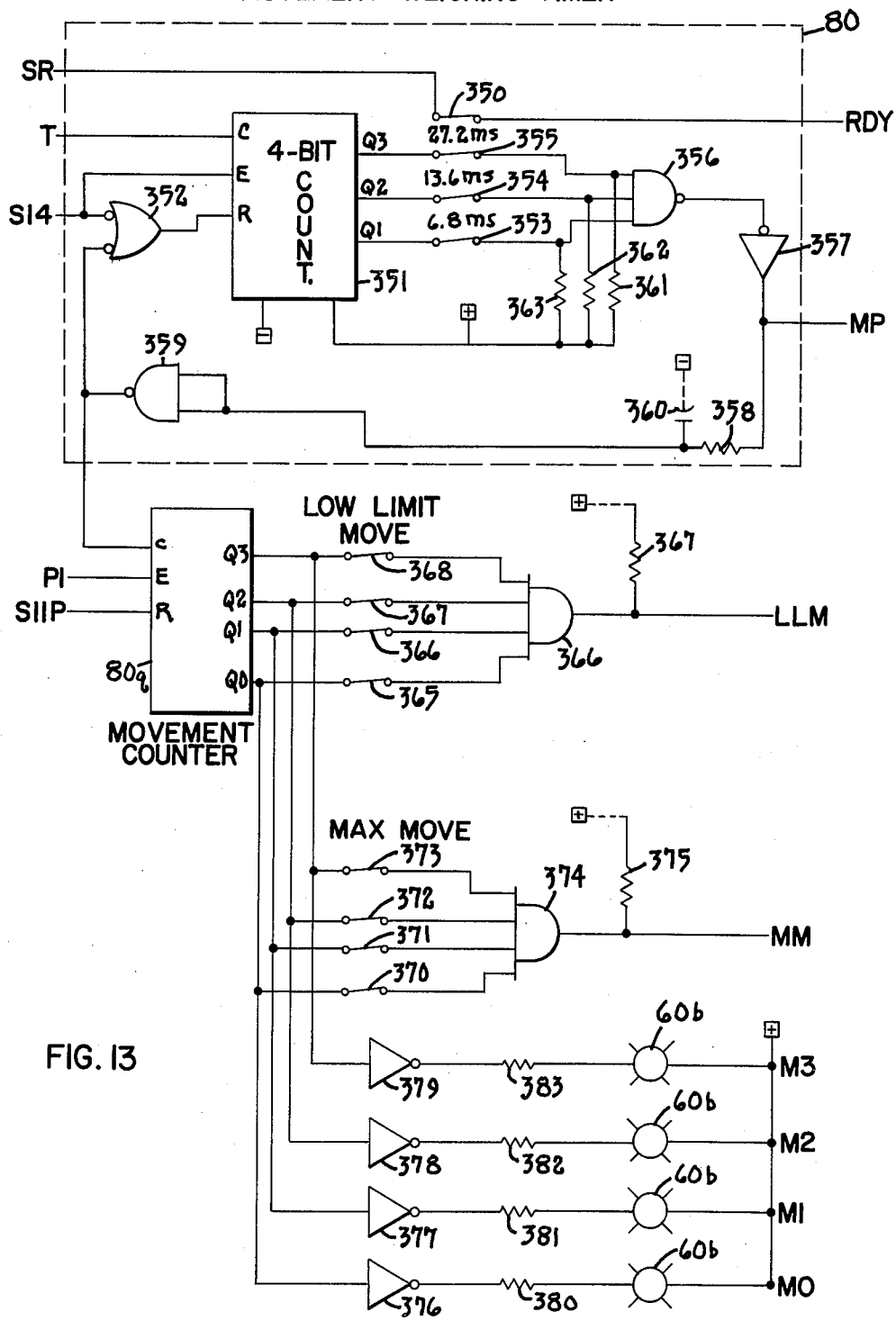
FIG. 13 is a schematic diagram of the Movement Counter, Movement Weighting Timer portions of the network disclosed in FIG. 4.

The Q output terminal of the Lower Flip Flop 80p is also connected to a first input terminal of a NAND Gate 347. The S13P step pulse signal is applied to the seond input terminal of the NAND Gate 347, the output signal of which comprises the PP13 system signal. The Movement Weighing Timer 80r, the Movement Counter 80q, and associated logic circuits are schematically illustrated in FIG. 13. Referring thereto, the Movement Weighing Timer portion of the circuit is generally illustrated at 80r. For ease of numbering reference, the circuits of FIG. 13 will be consecutively numbered as if they were within the Timing and Control portions of the circuit rather than as a portion of those functional blocks indicated in FIG. 4. The circuit components generally designated within the Movement Weighing Timer outline 80r, basically comprise an adjustable timer circuit which provides an output MP (Movement Pulse) which counts the P register up or down corresponding to the amount and polarity (direction) of movement instructed to be given to the potentiometer motor being controlled by the control unit 60 during any data processing cycle.

The SR system signal applied by means of a switch 350 becomes the RDY system signal after passing therethrough. The T signal is applied to a Clock input terminal of a 4-bit up counter 351. The counter 351 is in a preferred embodiment, of a type 4520. The S14 step signal is directly applied to the enable input terminal of the counter 351 and is also applied to a first input terminal of a NAND Gate 352. The output signal from the NAND Gate 352 is applied to the Reset input terminal of the counter 351.

The Q1, Q2, and Q3 output terminals of the counter 351 are respectively connected by means of switches 353, 354, and 355 to first, second, and third input terminals of a NAND Gate 356. The output signal from the NAND Gate 356 is applied by means of an invertor 357 to form the Movement Pulse (MP) output signal, and is also applied by means of the invertor 357 amd a resistor 358 to first and second input terminals of a NAND Gate 359. A capacitor 360 may be connected between the negative potential supply and the input terminals to the NAND Gate 359. The output signal from the NAND Gate 359 is applied to the second input terminal of the NAND Gate 352.

The three input terminals of the NAND Gate 356 are also connected by means of resistors 361, 362, and 363 to the positive potential supply.

The three switches 353, 354, and 355 provide for adjustment of weighting for processing data within the P register during a data processing cycle. The collective "setting" of the switches 353–355, therefore, comprises a Movement Weighting Set Point. The respective individual weights of the switches are indicated in FIG. 13 as 6.8 milliseconds (Switch 353), 13.6 milliseconds (Switch 354), and 27.2 milliseconds (Switch 355).

The output signal from the NAND Gate 359 is also applied to a Clock input terminal of the Movement Counter 80q. The P1 and S11P system signals are applied to the Enable and the Reset input terminals respectively of the Movement Counter 80q. In the preferred embodiment, the Movement Counter is a 4-bit counter of the 4520 type.

The Q0–Q3 output terminals of the Movement Counter 80q are respectively connected by means of four switches 365–368 respectively to provide input signals to an AND Gate 366. The output signal of the AND Gate 366 comprises the LLM system signal. A resistor 367 may be connected between the positive potential and the output terminal of the AND Gate 366.

The switches 365 through 368 provide for manual selection of the minimum amount of adjustment (i.e. Potentiometer movement) which can be provided to the Potentiometer within the Power Convertor 63 which is being controlled, should the measured Pressure be below the value set on the Pressure thumb-wheel switch 60c, but less than one measurable increment less than the preset value, when the tolerance values of the Sensor 56 are considered. In the preferred embodiment, this occurs when the measured pressure is below the value set on the Pressure thumb-wheel switch 60c by less than 10 p.s.i.

The Q0 through Q3 output terminals of the Movement Counter 80q are also connected by means of four switches 370–373 respectively to provide signal inouts to an AND Gate 374. The output signal from the AND Gate 374 comprises the MM (Maximum Movement) signal of the system. A Resistor 375 may be connected between the positive supply and the output terminal of the AND Gate 374. The four switches 370 through 373 provide selectable setting for establishing the "maximum" allowable movement in able to be made by the control system to the Potentiometer motor being controlled, so as to prevent complete disruption of the closed-loop system, should measurements or other components of the system provide erroneous control indications.

The Q0–Q3 output terminals of the Movement Counter 80*q* are also respectively connected by means of inerters 376–379 respectively and resistors 380–383 respectively to enable energization of indicator lamps 384–387 respectively from the positive supply, for providing a visual indication of the output status of the Movement Counter 80*q*.

Figure 14:
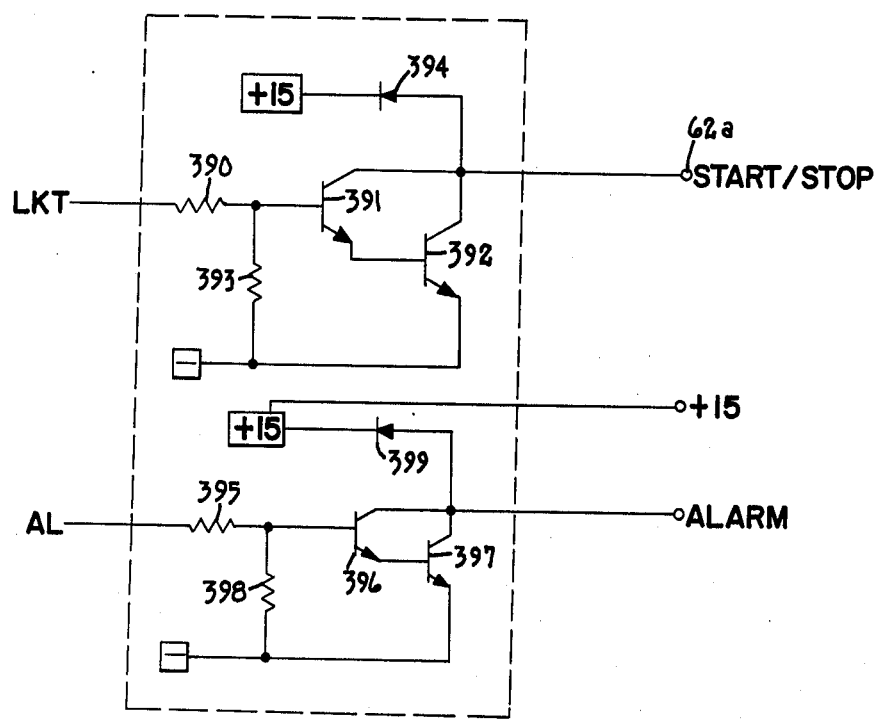
FIG. 14 is a schematic diagram of the A/C and Alarm Relay Drive portions of the network disclosed in FIG. 4.

Referring to FIG. 14, the Alarm and START/STOP output drive function are illustrated. The LKT signal is applied by means of a resistor 390 through to a base of an npn transistor 391 connected in Darlington configuration with an npn transistor 392. The emitter of the transistor 392 is connected to the negative supply, and a resistor 393 is connected between the base of the transistor 391 and the negative supply. The collectors of the transistor 391 and 392 are commonly connected by means of a diode 394 to the +15 volt supply, and also provide one terminal of the START/STOP signal (the other terminal being provided by the +15 volt supply) which is transmitted to the Power Convertor 63 by means of the Signal Flow Path 62*a* (see FIG. 2).

The AL signal is applied by means of a resistor 395 to the base of an npn transistor 396 connected in Darlington configuration with a second npn transistor 397. The emitter of the transistor 397 is connected to the negative supply, and a resistor 398 is connected between the base of the transistor 396 and the negative supply. The collectors of the transistor 396 and 397 are connected in common and by means of a diode 399 to the +15 volt supply. The collectors of the transistor 396 and 397 provide the output ALARM signal to an external alarm apparatus (not illustrated) by means of the Signal Flow Path 61*c* (see FIG. 2).

Figure 15:
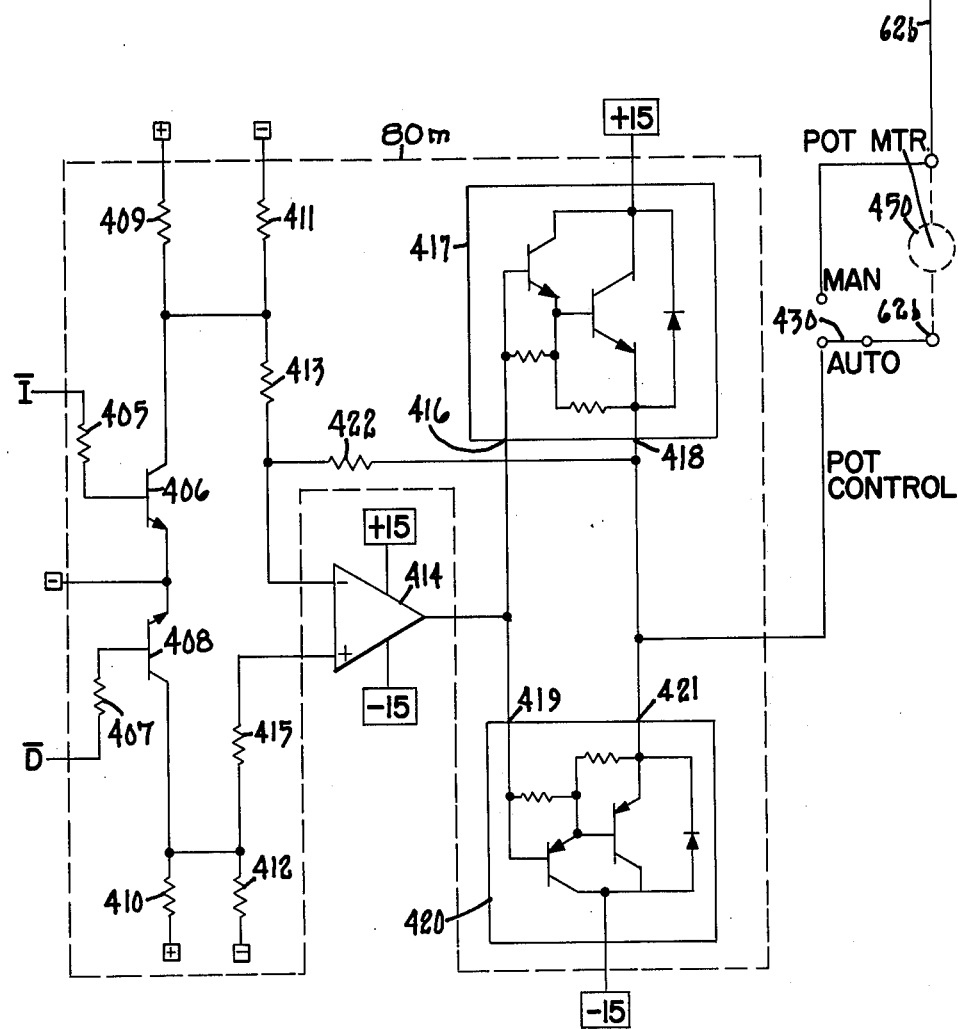
FIG. 15 is a schematic diagram of the Motor Driver portion of the network disclosed in FIG. 4.

Referring to FIG. 15, the Potentiometer Motor Driving circuit and the 15 volt D.C. power supply are illustrated. The D.C. power supply is illustrated at 400, providing +15 volt ad −15 volt output signals with respect to a common or ground reference. A fuse 401 and a muanual shut-off switch 402 are provided in the input lines from the 15 volt A.C. power source from which the D.C. voltage is generated.

The Motor Driver 80*m* is illustrated in the lower portion of FIG. 15. The $\bar{I}$ system signal is applied by means of a resistor 405 to the base of an npn transistor 406. The $\bar{D}$ system signal is applied by means of a resistor 407 to the base of an npn transistor 408. The emitters of the transistors 406 and 408 are commonly connected to one another and to the reference potential. The collectors of transistors 406 and 408 are respectively connected by means of resistors 409 and 410 to the positive supply potential, and by means of resistors 411 and 412 respectively to the reference supply potential.

The collector of transistors 406 is also connected by means of a resistor 413 to an inverting input of an operational amplifier 414. The collector of the transistor 408 is connected by means of a resistor 415 to the noninverting input of the operational amplifier 414. The operational amplifier 414 is biased by the ±15 volt power supply 400. The output signal from the operational amplifier 414 is directly connected to the input terminal 416 of an npn-type Darlington pair package 417. The Darlington configuration 417 is energized by the ±15 volt power supply, and provides an output signal at its output terminal for 18.

The output signal from the operational amplifier 414 is also applied to the input terminal 419 of a pnp-type Darlington pair configuration 420. The pnp Darlington configuration is energized by the −15 volt power supply, and provides a signal output at its output terminal 421, which is commonly connected to the output terminal 418 of the npn-type Darlington pair to provide the POTENTIOMETER CONTROL output signal. A feedback resistor 422 is connected between the inverting input of the operational amplifier 414 and the output terminal carrying the Potentiometer Control signal.

The POTENTIOMETER CONTROL signal is applied by means of a Switch 430 to the Signal Flow Path 62*b* for transmission to energize the motor of a motor control Potentiometer 450, which is mounted within the Power Converter 63 for controlling the frequency of the three-phase power signal applied to that induction motor 54.

The Switch 430 enables disablement of the control unit 60 in favor of manual operation of the Potentiometer Motor 450, if desired. The second conductor completing the Signal Flow Path 62*b* to the Potentiometer Motor 450 is connected to the common or reference terminal.

The Digital to Analog output circuits for driving the analog Temperature and Pressure recording units forming a part of the Additional Output Functions 64 (FIGS. 1 and 2) are illustrated in FIG. 16. Referring thereto, FIG. 16A illustrates a digital to analog convertor and drive circuit for the Temperature output function. The TA, TB, TC, TD, and TE digital temperature data signals are applied by means of the resistor network comprising the resistors 460–469 to the noninverting (+) input terminal of an operational amplifier 470. The output signal of the operational amplifier 470 is fed back to the inverting input of the amplifier and is also applied by means of a resistor 471 to a first output terminal and by means of a resistor pair 472 and 473, the common node of which is connected to the reference potential, to a second output terminal. The first and second output terminals provide the analog Temperature output signal to the Signal Flow Path 61*b* for transmission to an external temperature recording device (not illustrated). The operational amplifier 470 is biased by means of the +15 and −15 volt power supply.

The digital to analog Pressure recording circuit, illustrated in FIG. 16B, is identical in structure to that of the temperature analog drive. The digital pressure data signals PA–PE respectively are applied by means of the resistor network comprising the resistors 485–489 to the noninverting input of an operational amplifier 490. The output signal of the operational amplifier 490 is fed back to the inverting input thereof, and is also applied by means of the resistors 491–493 in manner as previously described with respect to the Temperature drive circuit, to first and second output terminals which provide the Pressure analog output signal to the Signal Flow Path 61*a* for transmission to an external pressure recording apparatus (not illustrated).

OPERATION OF THE PREFERRED EMBODIMENT

The purpose of the control unit illustrated in the typical figures, as applied to controlling the speed of operation of the Induction Motor 54, as applied to oil well drilling applications, is to accurately regulate the pressure of the oil within the Casing 50, at the bottom of the well, to maximize the pumping efficiency of the Pump 53. Since the oil pressure sensed by the Sensor 56 is directly proportional to the "height" of oil overlying the sensor, by controlling the "pressure" within the well, the control system insures that the proper oil level overlying the pump is maintained at all times during the pumping operation, regardless of pressure changes within the primary oil field, which will also have an effect upon the oil pressure level and pressure within the well Casing 50. The control apparatus of the preferred embodiment regulates the speed of the induction motor, and thus the Pump 53, so as to maximize oil pumping while creating as little "shock" to the primary oil field as possible, and does so in a manner which achieves an accuracy greater than that of the temperature and pressure measurement Sensor 56.

Besides providing an accurate pressure (i.e. pumping speed) control function, the Control unit also responds to temperature measurements made by the Sensor 56, to shut-down the Power Convertor 63, should excessive temperatures be attained at the bottom of the well, which could inflict damage to the Pump 53 or Induction Motor 54. Such temperature changes could be caused by significant increases in temperature in the basic oil field, or, should the pump be drawing in "air", meaning that the pump is no longer surrounded by oil which acts as its cooling medium.

Figure 21:
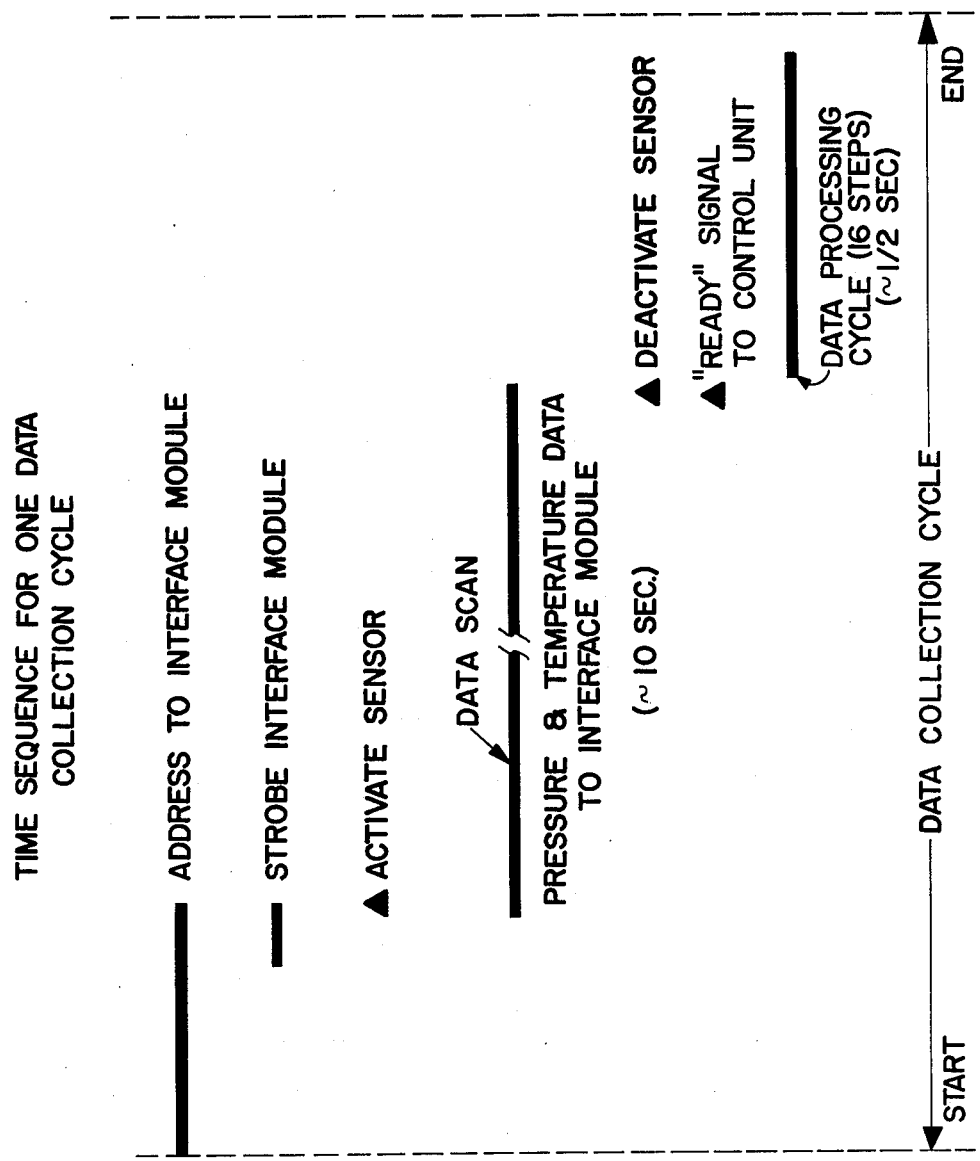
FIG. 21 is a time diagram illustrating the basic timing events which occur during one cycle of operation of the control circuit disclosed in FIGS. 1-20.

A summary of the basic system events in the closed-loop system disclosed in the preferred embodiment is diagrammatically illustrated in the time diagram of FIG. 21. Referring thereto, and to FIGS. 1 and 2, a Data Collection Cycle (the term referred to for one complete operational cycle of the closed-loop control system), is initiated by the Control Unit 60 transmitting a 4-bit address word (by means of the Signal Flow Path 59*a*), and a strobe pulse (by means of the Signal Flow Path 59*b*) to the Interface Module 58. The 4-bit address word and the strobe pulse are generated by the circuitry illustrated in FIG. 12. In the preferred embodiment, the strobe signal is a 62.5 millisecond pulse which is generated during the 125 millisecond address signal.

Upon receipt of the 4-bit address and the activating strobe signal, the Interface Module energizes the Sensor 56 identified by the address signal, enabling the Sensor 56 to transmit pressure and temperature data back to the Interface Module 58 by means of the Signal Flow Path 57*a*.

The Sensor 56 transmits temperature and pressure data in serial digital manner (incoded in grey code) as previously described, approximately over the next ten seconds. As previously described, the pressure information is contained within the digitally incoded signal transmitted to the interface module, and the length of the transmission represents the temperature data. This portion of the Data Collection Cycle is referred to as the Data Scan.

When the Data Scan is complete, the Interface Module 58 deactivates the Sensor 56, and presents the 9-bit temperature and pressure data words at its signal outputs for transmission to the Control Unit 60. The Interface Module then transmits the Temperature and Pressure READY signal (by means of the Signal Flow Path 59*c*) to the Control Unit 60, indicating that the temperature and pressure data are available for transmittal. The Interface Module 58 also transmits a SHORT signal by means of the Signal Flow Path 59*d* should a short circuit occur on the Signal Flow Path 57 to the Sensor 56.

In the preferred embodiment, the Sensor 56 has a maximum tolerance capability of 10 p.s.i. (i.e. a tolerance level of ±5%. Since the pressure information transmitted by the Sensor 56 is in digital form, its accuracy level can be no greater than 10 p.s.i. Accordingly, a change in "one" unit of information received from the Sensor 56, represents a 10 p.s.i. change of pressure reading.

Upon receipt of the READY signal, the Control Unit 60 effects a transfer of the 9-bit Temperature and 9-bit Pressure words from the Interface Module 58, and processes the received information during a Data Processing Cycle, which takes approximately one-half second to complete. When the Data Processing Cycle is complete the Control Unit will send a Potentiometer Control signal by means of the Signal Flow Path 62*b* to the Adjustable Frequency Power Converter 63 for moving a Potentiometer on the motor controlled Potentiometer for effecting a change in the frequency of the A.C. power sent to the Induction Motor 54.

A new Data Collection Cycle will be initiated, in the preferred embodiment approximately 30 seconds later (however this time is adjustable), when the Control Unit 60 again addresses and strobes the Interface Module 58.

Should the information processed by the Control Unit indicate a over-temperature condition in the oil well, the Control Unit 60 may de-energize the Power Converter 63 by means of the START/STOP signal provided on the Signal Flow Path 62*a*, or could re-energize the Power Converter 63 if it has already been shut down on a previous cycle, should the temperature now be within an acceptable range. A controller also will provide an ALARM output signal should the Power Converter be shutdown by means of the Signal Flow Path 61*c*, and also provides analog output signals for temperature and pressure recording devices.

The Data Processing Cycle executed by the Control Unit 60 is divided into 16 Steps (Steps 0-15). Before going into a detailed description of each of the 15 Steps, a general overview of the operation of the processing cycle will be helpful. It is important to recognize the fact that the Control Unit does not respond directly to the received pressure reading from the Sensor 56, but uses that pressure reading to make comparisons with previously received pressure readings, to formulate a final output control signal which is based upon both the present pressure reading and a factor which represents the accumulated changes in pressure readings recorded for a predetermined preceding number of Data Collection Cycles. In other words, the Control Unit has a memory, represented by the A&D Registers ADj, for retaining and maintaining an active history of the pressure conditions which have occurred at the bottom of the well over a predetermined number of immediately preceding Data Collection Cycles. In the preferred embodiment, such pressure history can be maintained for up to 64 preceding Data Collection Cycles. The memory which retains the pressure history file is constantly updated on each data processing cycle, such that only the pressure history from the last obtained 64 Data Collection Cycles is retained. The length of the memory can also be changed as desired.

The Control Unit circuitry is configured to provide a weighting factor to the accumulated pressure history data. Each oil well, due to the particular geological configurations and other properties peculiar to that particular well, will display unique pressure characteristics. For example, once the well has been operated for a period of time, and based upon other geological factors such as the overall capacity of the well, the type of geological configurations at the bottom of the well, the particular type of oil being extracted, and the like, pressure characteristics (such as expected changes in pressure in the primary oil reservoir over a period of time) can be somewhat predicted. Based upon that prediction, a value (i.e. a constant) can be determined as to the "weight" which is to be given to the accumulative pressure history data retained within the memory of the Control Unit. Should the geological, etc. conditions change over a long period of time, requiring a different weight to be given to the accumulated pressure history data, the Control Unit can be adjusted to accommodate the changing field characteristics. In the preferred embodiment, the Weight factor to be given to the accumulated pressure data stored within the Control Unit memory is determined by the DP/DT Weight switches 301–304 (see FIG. 8).

Referring to FIGS. 3, 4 and 5, it will be noted that an operator can insert Pressure settings into the Control Unit by means of the three-segment thumb-wheel Switch 60c. The pressure reading set into the Switch 60c will represent the desired pressure at which the Control Unit 60 is to maintain (by proper regulation of the Potentiometer motor of the Power Converter 63) at the situs of the Pump 53. The High Temperature and Low Temperature thumb-wheel Switch Settings (60d and 60e respectively), represent temperature settings. Basically, the High Temperature setting represents the maximum temperature allowable at the situs of the Pump 53 before the Control Unit will shut-down the pump operation, and the Low Temperature setting represents the temperature, following a shut-down process, which the oil being sensed must fall below before the pumping operation will be resumed.

Returning to the pressure considerations, the operation of the Control Unit 60 in regulating the speed of the Induction Motor 54 can be, in rough approximation, thought of as solving the following equation:

$$[\text{Pot.Movement}] = (\text{Psen.} - \text{Pset}) + K(\text{Psen.} - \text{Psen.} - X)$$

The equation says that the value of the control signal (i.e. the amount of Potentiometer movement), which is to be sent to the Power Convertor 63 at each Data Collection Cycle is determined by the difference between the pressure reading set upon the Switch 60c and the actually measured pressure (the first part of the equation), plus an additional factor represented by the $K(\text{Psen.} - \text{Psen.} - X)$. In the equation, the "Psen." term represents the pressure reading sensed during the current Data Collection Cycle, and the "Pset." term represents the desired pressure set into the Switch 60c. The second factor of the equation represents the additional amount of change in Potentiometer movement which is to be provided, based upon the accumulated pressure readings in memory, representing the past pressure history of the well. The "Psen. −X" term represents the accumulated pressure history factor stored in memory. The "K" term represents the "weight" factor set into the DP/DT Weight switches. Therefore, the second term of the equation in effect compares a currently received pressure measurement against the pressure history of the well over the last 64 Data Collection Cycles, gives a weight (by means of the K term) to that comparison, and adjusts the initially determined pressure change (represented by the first portion of the equation) by the historical factor.

An understanding of the various steps of the Data Processing Cycle will be better appreciated if the above equation description is kept in mind. Referring back to the equation, the first term thereof becomes predominant and significantly outweighs the second, when the measured pressure is significantly outside of a narrow tolerance band surrounding the "set" pressure (i.e. the pressure set on the Switch 60c). This would occur, for example, if the pump had not been operating for a period of time, requiring the pump speed to be significantly high for a length of time, until the desired pressure level is obtained. The second term of the equation becomes predominant once the measured pressure has attained the desired preset pressure value. At that point, as is the case with prior art controllers, an accuracy in pumping speed can generally not be attained which is any better than the accuracy of tolerances of the Sensor 56. In other words, once the pressure reading is within the "dead-band" (see FIG. 22) surrounding the desired pre-set pressure value, prior art controllers have not been able to "keep" the actual pressure at the bottom of the well "within" the dead-band.

For example, referring to FIG. 23, if the desired pressure is 100 p.s.i., and the sensor indicates a measured pressure of 95 p.s.i., due to the + or −5 p.s.i. accuracy tolerance limits of the sensor, the "actual" pressure within the well could be within the dead-band, as indicated at "A", or could be outside of the dead-band, as indicated at "B". With prior art control methods, when a measured value of 95 p.s.i. was attained, the pump speed would be decreased, as to raise the pressure level. The actual pressure level would begin to rise within the well, until the sensor were to provide a subsequent measurement reading of 105 p.s.i. (i.e. the next unit increment of measurement accuracy possible by the sensor). At that instant of time, the actual pressure within the well could be anywhere within the pressure band indicated at "C" in FIG. 22.

In reality, however, the actual pressure within the well will be over-shooting the desired pressure level and will most likely, due to the long time constants involved in stabilizing the pressure within a well, over-shoot the upper 105 p.s.i. level and actually be outside of the desired dead-band. As subsequent pressure measurements indicate the over-shoot, the prior art techniques would increase the pump speed so as to reduce the pressure, most likely causing an under-shoot of the dead-band within subsequent measurement cycles. This oscillatory pressure variance due to inaccurate and unpredictable control of the pump motor is undesirable, since optimum pumping levels are not being attained, and since such oscillatory pressure with the well creates an undesirable shock to the oil field.

Figure 24:
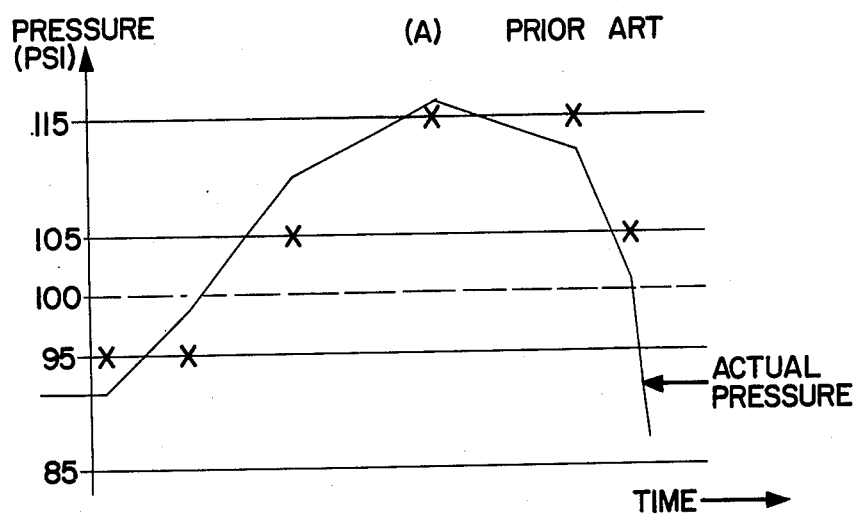
FIG. 24 is a pictorial drawing illustrating a comparison of the control effects obtained by usage of the present invention in oil pumping applications, compared with that obtainable by prior art techniques.
Figure 24:
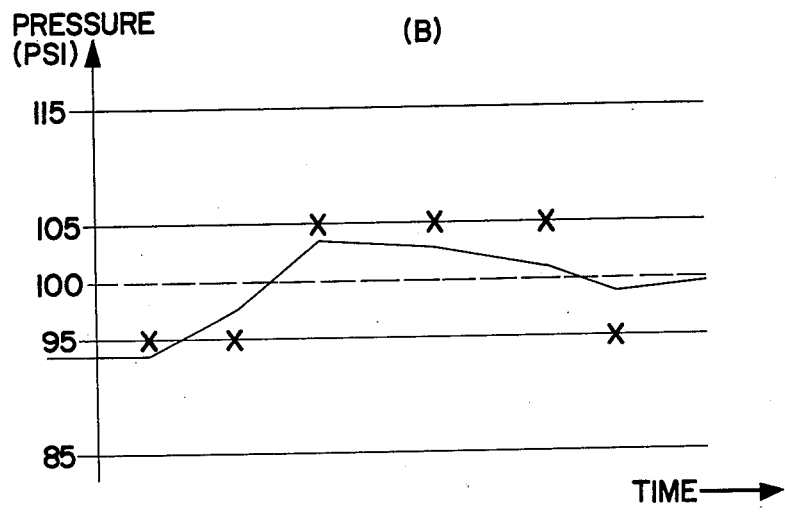

Referring to FIG. 24, the prior art over-shoot and under-shoot pump operations as applicable to pressure is indicated at FIG. 24A. With the present invention, the over-shoot and under-shoot of the desired pressure level is eliminated due to the "historical pressure" correction factor. A typical pressure situation at the bottom of a well being controlled by the present invention is illustrated in FIG. 24B. Referring thereto, once pressure measurements have been obtained which indicate that the actual pressure is within the "dead-band", the historical correction factor portion of the equation solved by the Control Unit 60 predominates and causes the change in motor speed to be controlled based primarily on the historical factor so as to cause the pressure to stay within the dead-band and approach the desired set value for the pressure as indicated by FIG. 24B.

With this background, the following description of the Data Processing Cycle steps will be more readily understood.

GENERAL DESCRIPTION-DATA PROCESSING CYCLE

The Data Processing Cycle is divided into 16 Steps (Steps 0–15). The Control Unit 60 waits in Step 0 for the READY signal from the Interface Module 58. The 9-bit Temperature data word is processed in Steps 1, 2 and 3. The temperature word is compared to the settings of the High Temperature or Low Temperature thumb-wheel Switches (60d and 60e respectively). If the temperature measured by the Sensor 56 is above the "high temperature" set point for two consecutive Data Collection Cycles, the Control Unit 60 will turn off the Power Convertor 63 (thus de-energizing the Induction Motor 54). The Power Converter 63 will remain de-energized until the sensed temperature is below the "low temperature" set point for two consecutive Data Collection Cycles, at which time the Control Unit 60 will re-energize the Power Convertor 63.

In Step 4, a check is made for possible erratic and, therefore, erroneous pressure data. If the current pressure measurement from the Sensor 56 differs by more than 10 p.s.i. (i.e. 1 measurable bit) from the reading obtained in the previous Data Collection Cycle, the pressure data received will be ignored, and no change in speed of the motor will be effected.

In Step 5, the change in pressure between the current Data Collection Cycle and the last Data Collection Cycle is stored in "memory". The Control Unit circuitry can remember the pressure changes which have occurred during as many as the last 64 Data Collection Cycles. The length of this "memory" can be varied from 1 to 64 Data Collection Cycles, as determined by the programming Switches 260–265 (see FIG. 8).

In Steps 6, 7 and 8, the pressure measured by the Sensor 56 is compared to the setting of the thumb-wheel Pressure Switch 60c. If the measured pressure is 20 p.s.i. or more below the setting of the Switch 60c, the Control Unit 60 will move the Potentiometer motor so as to decrease the frequency of energizing power to the induction motor (Switches 370–373 - FIG. 13). This is an emergency adjustment in speed to prevent the oil in the well from being pumped off, so as to prevent damage to the pump, and is not a normal speed adjustment.

The normal speed adjustment is the result of the data processing which occurs in Steps 9 through 14. As explained above, the speed adjustment is determined by the difference between the pressure at the Sensor and the set point pressure, modified by the pressure changes which have occurred during the span of "memory". The weighting of the effect of the changes in pressure with respect to the current difference in pressure between the Sensor and the set point is adjustable by the DP/DT Weight Switch settings of the control circuitry. The Control Unit will then raise or lower the frequency of the power applied to the Induction Motor 54 by an amount determined by the results of the processing of Steps 9 through 14.

In Step 15, the control unit circuitry waits until the READY signal is removed, at which time the control circuits return to Step 0 and wait for the next READY signal.

Step Description-Detail

The following Steps will briefly summarize the various operations performed by the Control Unit 60 circuitry set forth in the Drawing, during the Data Processing Cycle Steps.

Step 0

The "Step counter" is inhibited until the Control Unit receives a READY signal (at a logical "1") from the Interface Module 58.

Step 1

(a) The 9-bit temperature data word is clocked into the T Register 80c.

(b) If the Run/Stop Flip-Flop 80e is in the "run" condition, then the contents of the High Temperature Switch (60d) data are transferred to the B register 80f. If the Run/Stop Flip Flop is in the "stop" condition, then the contents of the Low Temperature Switch *(60e)* are transferred to the B Register.

(c) Two times the 9-bit Pressure data received from the Interface Module 58 is clocked into the P register 80g.

(d) The Ignore latch 80h is reset.

Step 2

The "Step counter" is inhibited, and the B and T Registers (80f and 80c respectively) are clocked down simultaneously. When one or both of the B and/or T Registers contain all "0's", further clocking of the B and T Registers is inhibited, and the Step generator circuitry is allowed to advance to Step 3. This Step effects a substraction of the contents of the B register from the contents of the T Register. Also, since the contents of the B Register was in binary coded decimal configuration and the T Register contents was in natural binary, this Step automatically converts the B Register contents to natural binary format. If the "set temperature" stored within the B register was the same as the measured temperature, both the B and the T Registers would reach the "0" condition at the same time. At the conclusion of Step 2, the contents of the B and T Registers will indicate which temperature was higher.

Step 3

In this Step, the controller decides whether to activate, deactivate or do nothing (with respect to Temperature) to the Power Convertor 63.

(a) The Run/Stop Counter 80d is advanced by "one" if either of the following conditions exist:
  (1) The Run/Stop Flip Flop 80e is in the "stop" condition, and the T Register contains all zeros. This means that the measured temperature is equal to or below the Low Temperature set point.
  (2) The Run/Stop Flip Flop is in the "run" condition, and the B Register contains all zeros. This means that the measured temperature is equal to or above the High Temperature set point.

(b) If neither of the above conditions exist, then the Run/Stop counter is reset. This means that the measured temperature is between the two "high" and "low" set points.

(c) If the Run/Stop counter reaches a count of two, then the "condition" of the Run/Stop Flip Flop is changed. It will be noted that the "two" count of the Run/Stop Counter requires that before a decision to turn on or off the Power Convertor 63 is made, identical temperature processing results must have been reached on two consecutive Data Processing Cycles.

Steps 0-3 evaluate the received Temperature data. The remaining Steps evaluate the received Pressure data.

Step 4

This Step checks for possible erratic and erroneous pressure data. Due to geological considerations, it is known that the measured pressure cannot change by more than one measurable increment or unit between two successive measurement readings.

(a) The Step Counter is inhibited, for as long as this Step requires. The P and E Registers (80g and 80i respectively) are pulsed up simultaneously. When the eleventh bit of both Registers appears at a logical "1", the Step Counter is allowed to advance to Step 5.

(b) The Ignore Latch 80h is "set" if either of the two following conditions occur at any time within Step 4:
  (1) If bits 11, 3 and 2 of the P Register are simultaneously at a logical "1" state; or
  (2) If bits 11, 3 and 2 of the E Register are simultaneously at a logical "1" condition.

Step 5

This Step basically determines whether the current pressure measurement has increased, decreased or stayed the same from previous measurements. The A Register can be thought of as the "add" Register, and the D Register can be thought of as the "decrease" Register.

The A and D Registers 80j are simultaneously shifted, one step, while the data indicated in column "C" of the Truth Table of FIG. 25 is entered into the A and D Registers by means of their respective "A" inputs. In the Truth Table, a "0" indicates that the condition is not true, and a "1" indicates that the condition is true (with respect to column "A" of the Table). Column B of the Table explains the physical "meaning" of the conditions specified in column A. The logic circuitry of the Timing and Internal Control networks (80) determine the information of column A and enter the appropriate data of column C in response to that determination. It will be noted that the "actual" pressure data is not entered into the A and D Registers, but only the "change" in pressure measurements between respective measurement cycles.

Step 6

It should be noted that the Interface Module 58 retains or holds the 9-bit temperature and pressure words at its data outputs, so that the Control Unit 60 can repetitively re-transfer that data information to the control circuits. In Step 6, two times the 9-bit pressure word is re-entered into the P Register, and the E Register is reset.

Step 7

The Step Counter is inhibited for the duration of this Step. The P Register is pulsed down and the E Register is pulsed up simultaneously. When the contents of the P Register is "zero", the pulsing of the P and E Registers is inhibited and the Step Counter is allowed to advance to Step 8. This Step effects a transfer of the contents of the P Register into the E Register.

Step 8

(a) Two times the 9-bit pressure data word is transferred into the P Register.

(b) The contents of the Pressure Set Switch (60c) are transferred to the B Register.

(c) The Low Limit Flip Flop 80k is reset. It should be noted that the Low Limit Flip Flop generally stays "set," unless there was a danger alarm in a preceding cycle, which would have cleared the Flip Flop.

Step 9

The Step Counter is inhibited for the duration of this Step. The P Register is pulsed down and simultaneously, the B Register is pulsed down at one-half the rate of pulsing of the P Register. If the twelfth bit of the P Register is a logical "1" at the same time that its second bit is at a logical "0", the Low Limit Flip Flop 80k is set. (This condition means that the measured pressure is 20 p.s.i. or more below the pressure set point.) When the contents of the B Register is "zero", inhibit further pulsing, and allow the Step Counter to advance to Step 10.

Therefore, at the end of Step 9, the contents of the P Register represents the difference between the pressure set point and the measured pressure. This represents the "first" part of the previously discussed equation. In the next Step, the "second", or historical portion of the above-described equation is determined.

Step 10

(a) Inhibit the Step Counter for the duration of this Step.

(b) Disable the "A" inputs of the A and D Registers.

(c) Enable the "B" inputs of the A and D Registers (i.e. end around shift).

(d) Using their "B" inputs, shift the A and D Registers simultaneously.

(e) When the DP/DT Weighting Counter reaches its preset value, inhibit shifting and allow advance to Step 11.

(f) While shifting the A and D Registers, the outputs of the A and D Registers are evaluated after each shift, and the contents of the P Register is modified according to the Truth Table disclosed in FIG. 26. Referring to Column A of the Truth Table, the logical output states for the A and D Registers are indicated. In the first row, the logical zeros indicate that there has been no change in pressure. In the second row, the logical ones correspond to an "ignore" case based on erroneous or impossible data. The last two data rows indicate that the pressure has changed, and indicates in what "direction" that change is. In its most basic terms, the "K" of the right-hand portion of the above-described equation is correlated to the number of times the A and D Registers are allowed to "go around" in this process, divided by two. For example, if we allow the A and D Registers to go around once, K equals 1, if they go around twice K equals 2, etc. The K is modified by the weighting switches.

Step 11

(a) Reset the P Register if the Ignore Latch 80h or the Low Limit Flip Flop 80k are set.

(b) Reset the Movement Counter 80q, which keeps track of how far the Potentiometer motor is moved at any one time.

(c) Reset the Raise Flip Flop 80*n* and the Lower Flip Flop 80*p*.

Step 12

This Step basically decides whether we should "raise" or "lower" the pump speed.

(a) Set the Raise Flip Flop, if P12 is a logical zero and the P Register does not contain all zeros.

(b) Set the Lower Flip Flop if P12 is a logical 1 (indicating that there is a negative number in the P Register), or if the Low Limit Flip Flop is set.

Step 13

(a) If the Lower Flip Flop 80*p* is set, pulse the P Register down by one count. This is a preliminary Step to get the right numbers into the P Register if we are going to effect a "lower" command.

Step 14

In this Step, the motor of the Potentiometer is actually caused to move.

(a) If the Raise Flip Flop 80*n* is set, energize the Potentiometer motor 450 to "increase" the induction motor speed.

(b) If the Lower Flip Flop 80*p* is set, energize the Potentiometer motor to "decrease" the induction motor speed.

(c) If the Lower Flip Flop is set, condition the P Register to count up.

(d) The Movement Weighting Timer 80*r* is activated to simultaneously step the Movement Counter 80*q* and the P Register.

(e) Inhibit the Sequence Counter until one of the following conditions exists:
   (1) The Lower Limit Latch is reset and the P Register CO (carry out) exists.
   (2) The Lower Limit Latch is reset and the Maximum Movement Timer has expired (i.e. the count within the timer has run out or has attained the maximum count in the Movement Counter).
   (3) The Lower Limit Latch is set and the Low Limit Timer expires.
   (4) The Ignore Latch is set.

Step 15

Inhibit the Sequence Timer until the READY signal appears at a logical low.

While the present invention has been described with respect to a particular closed-loop system and a particular application of that closed-loop system, it will be unerstood that other applications for the invention are possible. It will also be understood that many modifications to the circuitry and details of constructions of the control system can be implemented within the spirit and intent of the invention.

From the foregoing description, it will be appreciated that the present invention solves many of the problems and deficiencies associated with prior art controller systems involved with the control of sensed environmental conditions wherein the time constant involved in effecting changes to that sensed parameter are significantly long, such that analog closed-loop techniques are not practical.

Other modifications of the system will be apparent to those skilled in the art in light of the foregoing description. This description is intended to provide a specific example of an individual embodiment which clearly discloses the present invention. Accordingly, the invention is not limited to the described embodiment, or to the use of specific elements or circuits therein. All alternative modifications and variations of the present invention which fall within the spirit and broad scope of the appended claims are covered.

I claim:

1. In combination with:
   (a) an A.C. induction motor;
   (b) adjustable-frequency power converter means operatively connected with said induction motor for providing a variable frequency power signal to energize said induction motor, said frequency-converter being operable to provide an A.C. output signal having frequency determined by a received control signal;
   (c) means operated by said induction motor for performing a function which has an effect upon at least one external measurable parameter; and
   (d) sensor means disposed to sense said one measurable parameter for periodically providing a measurement signal responsive thereto, said measurement signal being accurate within a measurement error band based on the measurement accuracy of said sensor means;
   wherein the invention comprises:
   control means suitable for operative connection to receive said periodic measurement signals from said sensor means and to provide a control signal to said adjustable-frequency power converter means, for generating said control signal responsive to cummulative changes in said measurement signals received over a predetermined period of time, said control signal being of a nature whereby when applied to said power convertor, said power convertor energizes said motor so as to regulate said measurable parameter to an accuracy greater than the measurement accuracy of said sensor means.

2. The invention as recited in claim 1, wherein said control means includes:
   (a) means for determining the changes between successively received said measurement signals and for producing a measurement change signal responsive thereto;
   (b) memory means for storing a predetermined number of said measurement change signals representing those said measurement signals last received over a period of time; and
   (c) means for generating said control signal responsive to the cummulative value of said measurement change signals stored in said memory means.

3. The invention as recited in claim 2, wherein said control means further includes means for varying the length of said memory means so as to change the number of said memory change signals storable therein.

4. The invention as recited in claim 2, wherein said control means further includes adjustable weighting means operatively connected with said memory means for multiplying the cummulative value of said measurement change signals stored in said memory means by a weighting constant.

5. The invention as recited in claim 4, wherein said weighting means comprises a plurality of settable switches.

6. The invention as recited in claim 2, wherein said control means further includes:
   (a) means for receiving a preset value of said one measurable parameter;

(b) means for determining the change in value between the last received measurement signal and said preset value and for producing a preset difference change signal in response thereto; and (c) wherein said means for generating said control signal is responsive both to the cummulative value of said measurement change signals stored in said memory means and to said preset difference change signal.

7. A method of controlling the value of a measured parameter of an environment in a closed-loop control system to an accuracy greater than that of the means measuring said parameter, to maintain the value of said measured parameter within the maximum accuracy tolerance levels of the means measuring said parameter, said closed-loop system being characterized by: sensing means for measuring said one parameter and for providing a measurement signal responsive thereto, said sensing means having upper and lower measurement accuracy tolerance levels defining a measurement accuracy dead-band about the measurement signal; control means connected to receive said measurement signal for producing a control signal responsive thereto; and a prime mover connected to receive the control signal and being responsive thereto to act upon said environment, which action affects the value of said measured parameter; wherein the method comprises the steps of:

(a) determining a desired value at which said one parameter is to be maintained;

(b) causing the prime mover to act upon said environment so as to place the value of said one parameter within the measurement accuracy dead-band tolerance levels of said sensing means;

(c) periodically causing said sensing means to measure said one parameter, to periodically produce parameter measurement signals;

(d) causing said periodically produced measurement signals to be transferred to the control unit;

(e) determining the respective changes in values between successive ones of said periodically produced and transferred measurement signals and producing parameter change signals representative respectively of each said determined change in value;

(f) storing in a memory said respective parameter change signals which represent a predetermined successive number of said measurement signals last transferred in time to said control unit;

(g) determining a cumulative value of said stored parameter change signals;

(h) generating a control signal for changing the speed of the prime mover responsive to said determined cumulative value; and (i) causing said prime mover to be energized in response to said generated control signal whereby said prime mover acts upon said environment to maintain the value of said measured parameter at a value within the measurement accuracy dead-band tolerances of said sensing means, thereby attaining a control accuracy for said one parameter which is more accurate than the accuracy tolerance levels of the sensing means.

8. In a closed-loop control system, a method of changing a master control signal of the device acting upon an environment having at least one measured parameter, so as to control the value of said measured parameter to an accuracy greater than that of the apparatus measuring said one parameter, comprising the steps of:

(a) setting a predetermined desired value for said one measured environmental parameter;

(b) periodically obtaining a measurement signal indicative of the value of said one parameter of the environment that is to be controlled, said measurement signal so obtained being accurate within upper and lower measurement accuracy tolerance levels of the measuring apparatus;

(c) determining the respective changes in value between successive ones of said obtained measurement signals and producing first change signals representative of said respective value changes;

(d) storing in ordered manner as determined, said respective first change signals which represent a predetermined successive number of said measurement signals last measured in time;

(e) generating a first control signal representative of the cumulative values of said stored first change signals;

(f) determining the difference in value between the last obtained said measurement signal and said desired set value, and producing a second control signal representative thereof;

(g) generating a master control signal in predetermined proportion to said first and said second control signal; and (h) varying said master control parameter of said device acting on said environment in direct response to said master control signal, thereby controlling the value of said measured environmental parameter at a level of accuracy greater than that represented by said upper and said lower accuracy tolerance levels of said obtained measurement signals.

9. Control apparatus for a closed-loop control system suitable for providing a master control signal to a device within the closed system which acts upon an environmental medium having at least one measurable parameter desired to be controlled, so as to control the value of said measurable parameter to an accuracy greater than that of sensing apparatus within the closed-loop which obtains said measured parameter, comprising:

(a) means for setting a desired value for an environmental parameter being controlled by the closed-loop control system;

(b) means for periodically obtaining a measurement signal of said measured environmental parameter to be controlled, said measurement signal so obtained having upper and lower accuracy tolerance levels;

(c) means connected to receive said obtained measurement signals for determining the change in value of successively received ones of said obtained measurement signals and for producing first change signals representative respectively thereof;

(d) memory means operatively connected to receive said first change signals for storing and retaining in ordered manner said first change signals representing a predetermined successive number of said measurement signals last received in time;

(e) means operatively connected with said memory means for generating a first control signal representative of the cumulative value of said stored first change signals;

(f) means for determining the difference in value between the last obtained said measurement signal and said desired set value, and for providing a second control signal representative thereof;

(g) means operatively connected to receive said first and said second control signals, for generating a master control signal cumulatively representing the values of said first and said second control signals; and (h) means operatively connected to receive said master control signal and being responsive thereto to act upon said environmental medium to maintain the value of said measured parameter within a tolerance range of said set desired value which is tighter than the tolerance range of said measurement signal as represented by said upper and said lower tolerance levels.

10. Control apparatus as recited in claim 9, wherein said control apparatus further includes means for varying the length of said memory means so as to change the number of said first change signals storable therein.

11. The control apparatus as recited in claim 10, wherein said control means further includes adjustable weighting means oepratively connected with said memory means for multiplying the cumulative value of said first change signals stored in said memory means by a weighting constant.

* * * * *